US012216818B2

(12) United States Patent
Choi et al.

(10) Patent No.: US 12,216,818 B2
(45) Date of Patent: Feb. 4, 2025

(54) AUGMENTED REALITY DEVICE FOR OBTAINING DEPTH INFORMATION OF OBJECT AND OPERATING METHOD THEREOF

(71) Applicant: SAMSUNG ELECTRONICS CO., LTD., Suwon-si (KR)

(72) Inventors: Jongchul Choi, Suwon-si (KR); Sangho Yoon, Suwon-si (KR); Bonkon Koo, Suwon-si (KR); Jeonggeun Yun, Suwon-si (KR); Youngmo Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/384,648

(22) Filed: Oct. 27, 2023

(65) Prior Publication Data
US 2024/0069632 A1 Feb. 29, 2024

Related U.S. Application Data

(63) Continuation of application No. PCT/KR2022/005672, filed on Apr. 20, 2022.

(30) Foreign Application Priority Data

Apr. 30, 2021 (KR) .................... 10-2021-0056869

(51) Int. Cl.
*G06F 3/01* (2006.01)
*G06T 7/50* (2017.01)

(52) U.S. Cl.
CPC ............... *G06F 3/013* (2013.01); *G06T 7/50* (2017.01); *G06T 2207/10028* (2013.01)

(58) Field of Classification Search
CPC .......... G06F 3/011; G06F 3/013; G06T 19/00; G06T 2207/10028; G06T 7/50;
(Continued)

(56) References Cited

U.S. PATENT DOCUMENTS 9,489,574 B2  11/2016 Lee et al.
10,362,296 B2  7/2019 Price et al.
(Continued)

FOREIGN PATENT DOCUMENTS

JP  2015-228994 A  12/2015
KR  10-1343875 B1  12/2013
(Continued)

OTHER PUBLICATIONS

International Search Report and Written Opinion issued Jul. 22, 2022 by the International Searching Authority in International Patent Application No. PCT/KR2022/005672 (ISA/220, ISA/210 and ISA/237).

*Primary Examiner* — Dmitriy Bolotin
(74) *Attorney, Agent, or Firm* — Sughrue Mion, PLLC

(57) ABSTRACT

An augmented reality (AR) device for obtaining depth information of an object in a real world, includes: a gaze tracking sensor configured to obtain a gaze point by tracking a gaze direction of a user's eye; a depth sensor configured to obtain depth information of the object; a memory storing one or more instructions; and at least one processor configured to execute the one or more instructions to: determine a region of interest (ROI) confidence level indicating a degree to which at least one partial region within a field of view (FOV) of the AR device is predicted as an ROI, based on at least one of a moving speed, an acceleration, a fixation time, a fixation number, or a location of the gaze point; determine an ROI based on the ROI confidence level; and set a
(Continued)

parameter for controlling an operation of the depth sensor to obtain depth information of the object within the ROI.

13 Claims, 18 Drawing Sheets

(58) Field of Classification Search
CPC ...... G06V 10/147; G06V 10/25; G06V 20/20; G06V 40/18
See application file for complete search history.

(56) References Cited

U.S. PATENT DOCUMENTS

| | | | |
|---|---|---|---|
| 10,587,792 B2 | 3/2020 | Narang et al. | |
| 10,705,605 B2 | 7/2020 | Ikuta et al. | |
| 10,769,779 B2 | 9/2020 | Kim et al. | |
| 11,249,305 B2 | 2/2022 | Koo et al. | |
| 11,527,004 B2 | 12/2022 | Koo et al. | |
| 11,995,766 B2* | 5/2024 | Arbabian | G06V 20/52 |
| 2013/0215147 A1* | 8/2013 | Hilkes | G09G 5/377 |
| | | | 345/633 |
| 2014/0283227 A1* | 9/2014 | Mosley | B82Y 35/00 |
| | | | 850/1 |
| 2016/0027215 A1* | 1/2016 | Burns | G02B 27/0103 |
| | | | 345/626 |
| 2016/0171299 A1* | 6/2016 | Lee | G06F 3/04842 |
| | | | 382/128 |
| 2017/0160518 A1* | 6/2017 | Lanman | G02B 27/0093 |
| 2017/0308162 A1* | 10/2017 | Xu | G06F 16/436 |
| 2019/0026948 A1* | 1/2019 | Kellogg | G06T 19/006 |
| 2020/0256993 A1 | 8/2020 | Oggier | |
| 2020/0326775 A1* | 10/2020 | Koo | G06F 3/017 |
| 2020/0379214 A1 | 12/2020 | Lee et al. | |
| 2021/0051260 A1 | 2/2021 | Lee et al. | |
| 2023/0070385 A1 | 3/2023 | Koo et al. | |

FOREIGN PATENT DOCUMENTS

| | | |
|---|---|---|
| KR | 10-1413558 B1 | 8/2014 |
| KR | 10-2017-0046105 A | 4/2017 |
| KR | 10-2011910 B1 | 10/2019 |
| KR | 10-2020-0120466 A | 10/2020 |
| KR | 10-2020-0136297 A | 12/2020 |
| KR | 10-2021-0019826 A | 2/2021 |
| KR | 10-2021-0150881 A | 12/2021 |

* cited by examiner

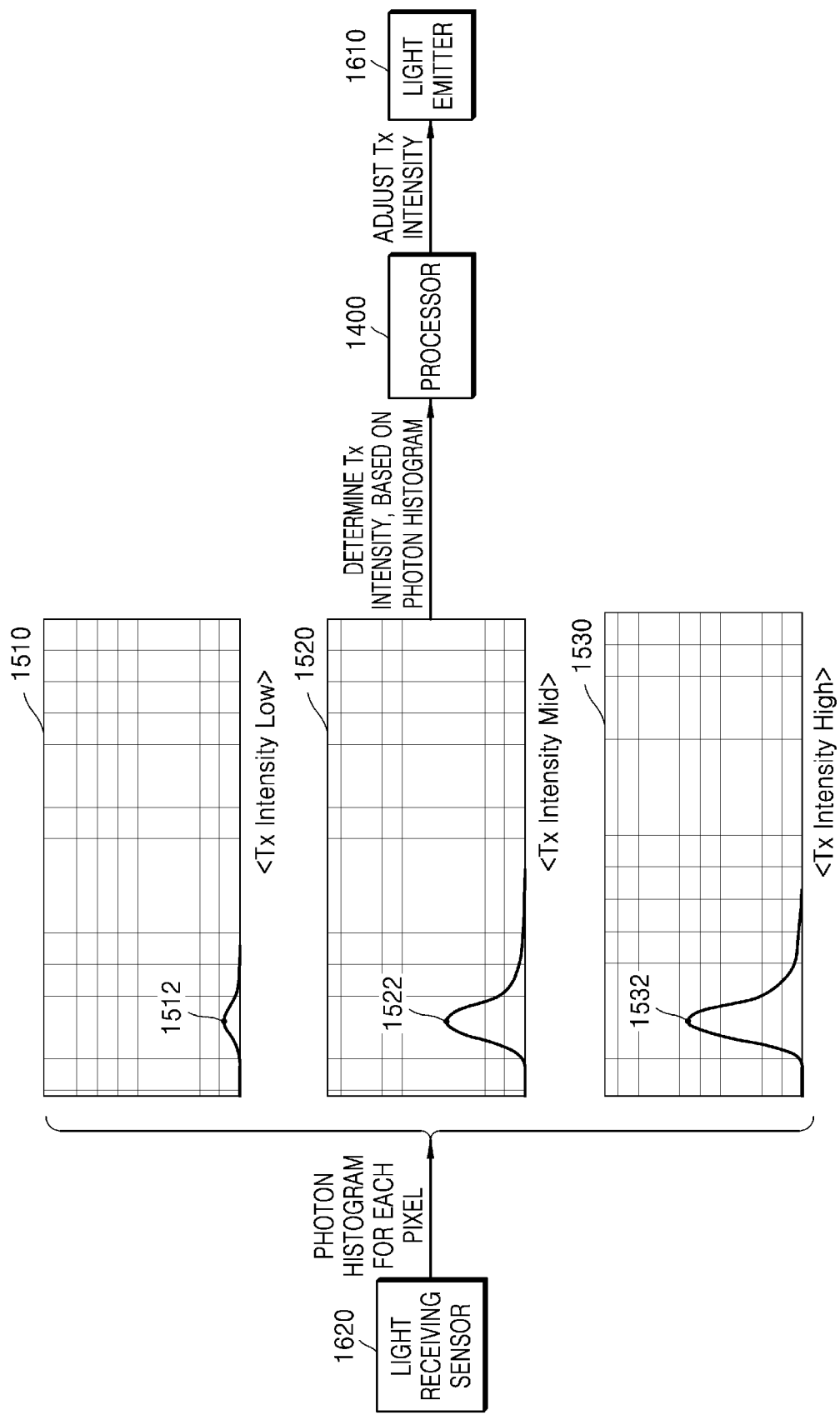

AUGMENTED REALITY DEVICE FOR OBTAINING DEPTH INFORMATION OF OBJECT AND OPERATING METHOD THEREOF

CROSS-REFERENCE TO RELATED APPLICATIONS

This application is a continuation of International Application No. PCT/KR2022/005672, filed on Apr. 20, 2022, in the Korean Intellectual Property Receiving Office, which is based on and claims priority to Korean Patent Application No. 10-2021-0056869, filed on Apr. 30, 2021, in the Korean Intellectual Property Office, the disclosures of which are incorporated by reference herein in their entireties.

BACKGROUND

1. Field

The disclosure relates to an augmented reality (AR) device for obtaining depth information of an object, and an operation method of the AR device, and more particularly, to an AR device for setting parameters of a depth sensor to obtain depth information for a region of interest (ROI) including an object that a user looks at or points at among the entire region within the user's field of view (FOV), and an operation method of the AR device.

2. Description of Related Art

AR is a technology for overlaying a virtual image on a physical environment space of the real world or on a real world object and displaying the virtual image together with the physical environment space or the real world object. An AR device (e.g., smart glasses) using AR technology is efficiently used in everyday life, for example, for information search, route guidance, and camera photographing. In particular, smart glasses are worn as a fashion item and mainly used for outdoor activities.

Recently, a device including a depth sensor for obtaining depth information has been widely used in order to express a sense of space of an object included in a real space composed of a three-dimensional (3D) space. A conventional depth information obtainment technology using a depth sensor performs depth sensing on all objects included in the entire area within an FOV without considering a user's region of interest and obtains depth value information. However, due to limitations such as miniaturization of recent devices and battery capacity for portability, when depth sensing is performed on the entire area within the field of view, the amount of computation increases, leading to an increase in power consumption. In addition, because the gaze of a user using a device at an object or a hand gesture pointing at the object, for example, is continuous and changes in real time, when depth sensing is performed on the entire area and then depth sensing is performed again on an area changed according to the gaze or the hand gesture, unnecessary power consumption increases.

SUMMARY

Provided are an augmented reality (AR) device for setting parameters of a depth sensor to obtain only depth information for a region of interest (ROI) including an object that a user looks at or points at among the entire region within the user's field of view (FOV), and an operation method of the AR device.

Additional aspects will be set forth in part in the description which follows and, in part, will be apparent from the description, or may be learned by practice of the presented embodiments.

According to an aspect of the disclosure, an augmented reality (AR) device for obtaining depth information of an object in a real world, includes: a gaze tracking sensor configured to obtain a gaze point by tracking a gaze direction of a user's eye; a depth sensor configured to obtain depth information of the object; a memory configured to store one or more instructions; and at least one processor configured to execute the one or more instructions to: determine a region of interest (ROI) confidence level indicating a degree to which at least one partial region within a field of view (FOV) of the AR device is predicted as an ROI, based on at least one of a moving speed, an acceleration, a fixation time, a fixation number, or a location of the gaze point; determine an ROI based on the ROI confidence level; and set a parameter for controlling an operation of the depth sensor to obtain a depth information of the object within the ROI.

The at least one processor may be further configured to determine the ROI confidence level based on at least one of a fixation time and a fixation number of a gaze point at which gaze directions of both eyes of the user converge, a moving speed of the gaze point, an acceleration of the gaze point, or a location of the gaze point.

The at least one processor may be further configured to determine the ROI confidence level based on a proportional relationship with at least one of the fixation time or the fixation number of the gaze point.

The at least one processor may be further configured to determine the ROI confidence level according to an inversely proportional relationship with at least one of the moving speed or the acceleration of the gaze point.

The at least one processor may be further configured to determine, as the ROI, at least one partial region of which the ROI confidence level is greater than or equal to a preset threshold value.

The AR device may further include a camera configured to photograph the FOV of the AR device to obtain an image of the FOV, wherein the at least one processor may be further configured to adjust a resolution and a frame rate of a portion of a depth map image obtained by the camera that corresponds to the determined ROI to values higher than a depth map resolution and a frame rate of another portion.

The depth sensor may include a light emitter configured to radiate light onto the object, and the at least one processor may be further configured to resize the ROI so that a predetermined amount of light and a predetermined number of pattern light beams are radiated onto the determined ROI by the light emitter.

The light emitter may include a light source and a liquid crystal (LC)-based reflection mirror, and the at least one processor may be further configured to adjust a power applied to the LC-based reflection mirror by changing an arrangement of LC molecules within an LC layer of the LC-based reflection mirror, so that the pattern light beams are radiated to the ROI.

The depth sensor may further include a light receiving sensor including a plurality of sections, the light receiving sensor being configured to receive the light radiated by the light source and reflected by the object, on/off operations of the plurality of sections are sequentially controlled according to a preset clock signal, and the at least one processor may be further configured to control the light receiving sensor to sequentially turn on at least one section corresponding to the ROI among the plurality of sections and maintain at least one section not corresponding to the ROI in an off state.

According to an aspect of the disclosure, an operation method of an augmented reality (AR) device for obtaining depth information of an object in a real world, includes: obtaining a gaze point by tracking a gaze direction of a user's eye; determining a region of interest (ROI) confidence level indicating a degree to which at least one partial region within a field of view (FOV) of the AR device is predicted as an ROI, based on at least one of a moving speed, an acceleration, a fixation time, a fixation number, or a location of the gaze point; determining an ROI, based on the ROI confidence level; and setting a parameter for controlling an operation of a depth sensor of the AR device that is used to obtain a depth information of the object within the ROI.

The determining the ROI confidence level may include determining the ROI confidence level, based on at least one of a fixation time and a fixation number of a gaze point, at which gaze directions of both eyes of the user converge, a moving speed of the gaze point, an acceleration of the gaze point, or a location of the gaze point.

The determining the ROI may include determining, as the ROI, at least one partial regions of which the determined ROI confidence level is greater than or equal to a preset threshold value.

The depth sensor may include a light emitter configured to generate radiate the light onto the object, and the setting of the parameter of the depth sensor may include resizing the ROI so that a predetermined amount of light and a predetermined number of pattern light beams are radiated onto the determined ROI by the light emitter.

The depth sensor may include a light receiving sensor including a plurality of sections, the light receiving sensor being configured to receive the light radiated by the light emitter and reflected by the object, on/off operations of the plurality of sections are sequentially controlled according to a preset clock signal, and the setting the parameter of the depth sensor may include sequentially turning on at least one section corresponding to the ROI among the plurality of sections and maintaining at least one section not corresponding to the ROI in an off state.

According to an aspect of the disclosure, a non-transitory computer-readable storage medium stores instructions which are executable at least one processor of an augmented reality (AR) device to perform a method to obtain depth information of an object in a real world, the method including: obtaining a gaze point by tracking a gaze direction of a user's eye; determining a region of interest (ROI) confidence level indicating a degree to which at least one partial region within a field of view (FOV) of the AR device is predicted as an ROI, based on at least one of a moving speed, an acceleration, a fixation time, a fixation number, or a location of the gaze point; determining an ROI, based on the ROI confidence level; and setting a parameter for controlling an operation of a depth sensor of the AR device that is used to obtain a depth information of the object within the ROI.

DESCRIPTION OF THE DRAWINGS

The above and other aspects, features, and advantages of certain embodiments of the present disclosure will be more apparent from the following description taken in conjunction with the accompanying drawings, in which:

FIG. 15 is a diagram illustrating an embodiment in which an AR device according to the disclosure adjusts a transmission signal intensity (Tx intensity) of a light emitter, based on a photon histogram for each pixel obtained from a light receiving sensor.

DETAILED DESCRIPTION

Figure 1:
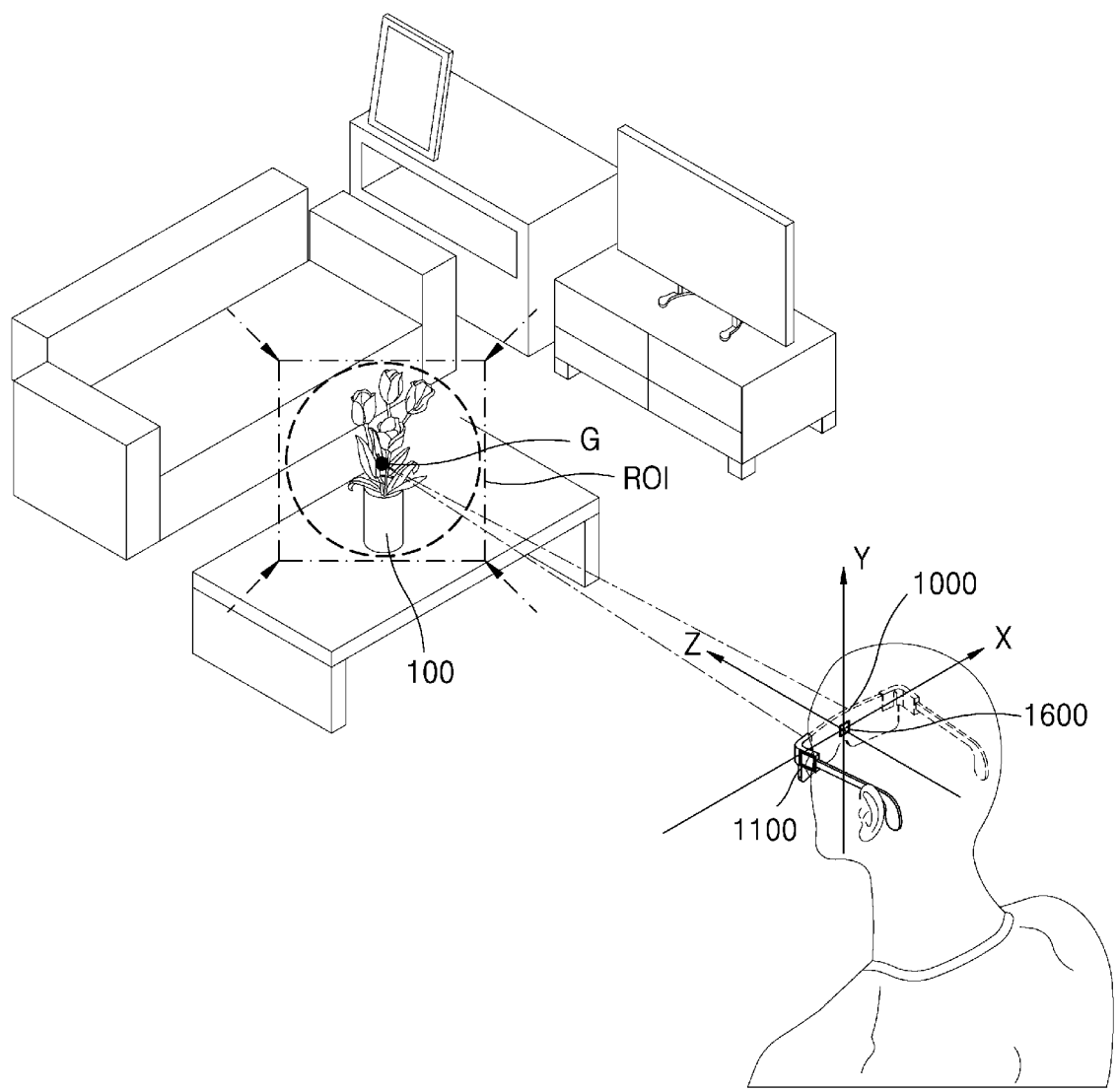
FIG. 1 is a conceptual diagram for explaining an operation method of an augmented reality (AR) device, according to an embodiment of the disclosure.

Although general terms widely used at present were selected for describing the disclosure in consideration of the functions thereof, these general terms may vary according to intentions of one of ordinary skill in the art, case precedents, the advent of new technologies, or the like. Terms arbitrarily selected by the applicant of the disclosure may also be used in a specific case. In this case, their meanings need to be given in the detailed description of an embodiment of the disclosure. Hence, the terms must be defined based on their meanings and the contents of the entire specification, not by simply stating the terms.

An expression used in the singular may encompass the expression of the plural, unless it has a clearly different meaning in the context. Unless otherwise defined, all terms (including technical and scientific terms) used herein have the same meaning as commonly understood by one of ordinary skill in the art to which this disclosure belongs.

The terms "comprises" and/or "comprising" or "includes" and/or "including" used herein specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

The expression "configured to (or set to)" used herein may be used interchangeably with, for example, "suitable for", "having the capacity to", "designed to", "adapted to", "made to", or "capable of", according to situations. The expression "configured to (or set to)" may not only necessarily refer to "specifically designed to" in terms of hardware. Instead, in some situations, the expression "system configured to" may refer to a situation in which the system is "capable of" together with another device or component parts. For example, the phrase "a processor configured (or set) to perform A, B, and C" may refer to a dedicated processor (such as an embedded processor) for performing a corresponding operation, or a generic-purpose processor (such as a central processing unit (CPU) or an application processor (AP)) that can perform a corresponding operation by executing one or more software programs stored in a memory.

As used herein, 'augmented reality (AR)' refers to a technology for displaying a virtual image on a physical environment space of the real world or displaying a real world object and a virtual image together.

A 'device' is a device capable of implementing 'AR', and generally includes not only AR glasses which are worn on the face of a user but also a head mounted display (HMD) apparatus or an AR helmet which is worn on the head of a user. However, the disclosure is not limited thereto, and the device may be any type of electronic device, such as a mobile phone, a smartphone, a laptop computer, a desktop computer, a tablet PC, an e-book terminal, a digital broadcast terminal, a personal digital assistant (PDA), a portable multimedia player (PMP), a navigation device, an MP3 player, a camcorder, an internet protocol television (IPTV), a digital TV (DTV), or a wearable device.

In the disclosure, a 'Field of View (FOV)' refers to an area that a user is able to observe at one time through a lens or display of a device.

In the disclosure, a 'Point of Interest (POI)' refers to a specific point or area on an object in the real world that a user looks at or points to through an AR device. According to an embodiment, the point of interest may be a gaze point according to the gaze direction of a user, or a point that is determined by hand gesture, a touch input, or by input through an input controller.

In the disclosure, a 'gaze direction' refers to a direction in which a user gazes, and a 'gaze' refers to a virtual line directed from the user's pupil in the gaze direction. Generally, the augmented reality device may calculate gaze direction based on information obtained by a gaze tracking sensor, and estimate the gaze of the user.

In the disclosure, a 'gaze point' indicates a point at which a user gazes, and refers to a point at which gaze directions of both eyes of the user converge. According to an embodiment, the gaze point may be determined according to binocular disparity and may be detected by triangulate.

Embodiments of the disclosure are described in detail herein with reference to the accompanying drawings. The disclosure may, however, be embodied in many different forms and should not be construed as being limited to the examples set forth herein.

FIG. 1 is a conceptual view for explaining an operation method of an AR device 1000 according to an embodiment of the disclosure.

The AR device 1000 according to the disclosure may be AR glasses in the form of glasses worn on a user's face. However, the disclosure is not limited thereto, and the AR device 1000 may be a head mounted display (HMD) worn on the user's head, or an AR helmet. However, the disclosure is not limited thereto.

The AR device 1000 may provide virtual image content that is displayed on a waveguide, as well as a real object, by executing an application. The AR device 1000 may execute, for example, a movie application, a music application, a photo application, a gallery application, a web browser application, an e-book reader application, a game application, an AR application, an SNS application, a messenger application, an object recognition application, or the like to thereby provide the user with a virtual image content displayed on each application.

Referring to FIG. 1, the AR device 1000 may detect a gaze point G for looking at an object 100 of the real world according to a gaze direction of a user, and may obtain point of interest information including at least one of a moving speed, acceleration, fixation time, fixation number, and location of the gaze point G. In the disclosure, a 'Point of Interest (POI)' refers to a specific point or area on the object 100 in the real world that the user looks at or points to through the AR device 1000.

In the embodiment shown in FIG. 1, the POI may be the gaze point G according to the gaze direction of the user. The AR device 1000 may include a gaze tracking sensor 1100, and may use the gaze tracking sensor 1100 to detect the gaze point G at which gaze directions of the user's left eye and right eye converge, and to obtain two-dimensional (2D) location coordinate values of the gaze point G. The moving speed and acceleration of the gazing point G refer to a moving speed and acceleration of the location coordinates of the gazing point G that are moved according to a change in the gaze direction of the user. The 'fixation time' of the gaze point G refers to the time during which the user's gaze stays on a specific area or specific object, and the 'fixation number' refers to the number of times the user's gaze stays on the specific area or object for a preset threshold time or more.

The AR device 1000 may calculate an ROI confidence level, which is an indicator indicating a degree of prediction as an ROI among the entire area, based on at least one of the moving speed, acceleration, fixation time, fixation number, and location of the gaze point G. The 'entire area' refers to a real space included in an FOV determined through a lens or camera of the AR device 1000.

According to an embodiment, the AR device 1000 may calculate the ROI confidence level according to an inversely proportional relationship with respect to at least one of the moving speed and acceleration of the gaze point G. For example, the faster the moving speed or acceleration of the gaze point G is, the lower the ROI confidence level may be calculated, and the slower the moving speed or acceleration of the gaze point G is, the higher the ROI confidence level may be calculated.

According to another embodiment, the AR device 1000 may calculate the ROI confidence level according to a proportional relationship with respect to at least one of the fixation time and fixation number of the gaze point G. For example, the AR device 1000 may calculate a high ROI confidence level of a region corresponding to the object 100 as the fixation time or fixation number of the gaze point G that stays on the object 100 increases, and may calculate a low ROI confidence level as the fixation time or fixation number decreases.

The AR device 1000 may determine an ROI among the entire area, based on the calculated ROI confidence level, and may obtain depth information about the ROI by using a depth sensor 1600. According to an embodiment, the AR device 1000 may determine, as the ROI, a region of which the ROI confidence level is greater than or equal to a preset threshold value among the gaze point G and a surrounding region including the gaze point G. According to an embodiment, the AR device 1000 may include a depth sensor 1600 configured to obtain depth information for at least one object 100 included in the real world. The 'depth information' refers to information about a distance from the depth sensor 1600 to a specific object 100. As the distance from the depth sensor 1600 to the specific object 100 increases, a depth value increases, and, as the distance decreases, the depth value decreases. In the embodiment shown in FIG. 1, on a 3D space, the X axis may be a reference axis passing left and right through the AR device 1000, the Y axis may be a reference axis passing vertically through the AR device 1000, and the Z axis may be a reference axis passing back and forth through the AR device 1000. The X-axis, the Y-axis, and the Z-axis may be perpendicular to each other. Accordingly, depth information according to an embodiment may refer to a distance on the Z axis from the depth sensor 1600 to a specific object.

According to an embodiment, the depth sensor 1600 may be configured as a Time of flight (TOF) sensor configured to radiate pattern light to the object 100 by using a light source and obtain depth value information according to the time taken until the radiated pattern light is reflected by the object 100 and received through a light receiving sensor. However, the disclosure is not limited thereto, and the depth sensor 1600 may be configured as a sensor that obtains depth information by using at least one of a structured light method and a stereo image method. The depth sensor 1600 will be described in detail with reference to FIG. 10.

The AR device 1000 may set a parameter for controlling an operation of the depth sensor 1600, in order to obtain depth information for the ROI. The parameter for controlling the operation of the depth sensor 1600 may include, for example, at least one of a light emission amount and a light emission location of a light emitter 1610 (see FIG. 2) configured to radiate light to the ROI, power applied to a liquid crystal (LC)-based reflection mirror included in the light emitter 1610, and an on/off control parameters of single-photon avalanche diodes (SPAD) constituting a light receiving sensor 1620 (see FIG. 2). A specific embodiment in which the AR device 1000 controls operating parameters of the depth sensor 1600 according to the ROI determined based on the ROI confidence level will be described in detail with reference to FIGS. 11 through 15.

A conventional depth information obtainment technology using a depth sensor performs depth sensing on all objects included in the entire area within an FOV without considering a user's ROI and obtains depth value information. However, when depth sensing is performed on the entire area within the FOV, the amount of computation increases, processing time slows down, and power consumption increases. In addition, because a POI such as the gaze of a user using a device at an object or a hand gesture pointing at the object is continuous and changes in real time, when depth sensing is performed on the entire area to obtain a frame, and then depth sensing is performed again according to a movement of the POI to obtain a next frame, depth value information for all objects needs to be obtained again, and thus the amount of power consumption increases. Due to limitations such as miniaturization of recent devices and battery capacity for portability, an increase in power consumption may cause a problem in portability and usage convenience.

The AR device 1000 according to an embodiment of the disclosure may calculate the ROI confidence level based on at least one of the moving speed, acceleration, fixation time, fixation number, and location of the gaze point G, and set the operating parameters of the depth sensor 1600 to obtain only the depth value information about the ROI determined according to the confidence level of an ROI other than the entire area included in the FOV, thereby reducing the amount of calculations and the amount of power consumption. Accordingly, the AR device 1000 according to the disclosure may increase a battery use time and improve user convenience.

Figure 2:
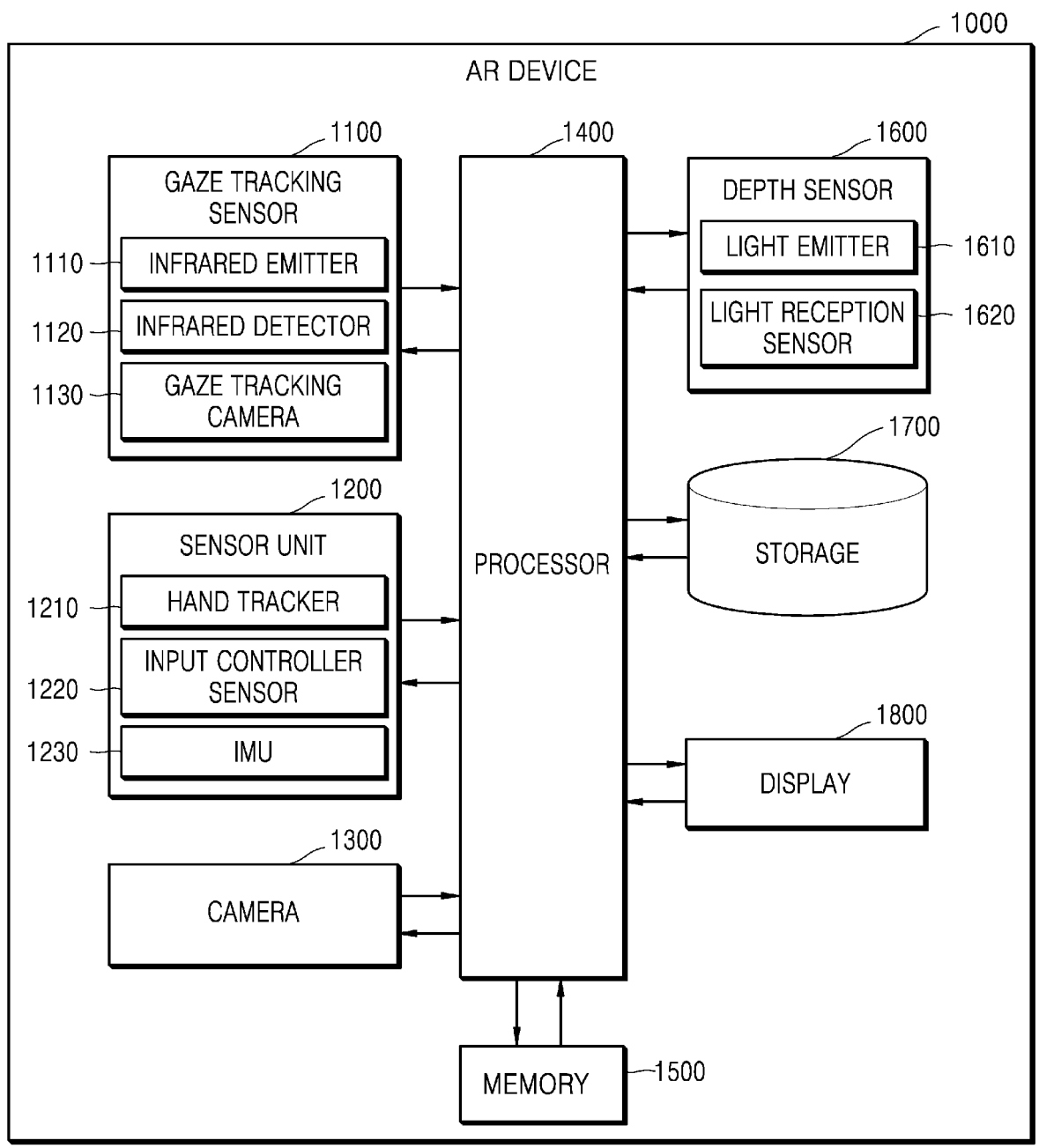
FIG. 2 is a block diagram of the AR device, according to an embodiment of the disclosure.

FIG. 2 is a block diagram of the AR device 1000 according to an embodiment of the disclosure.

The AR device 1000 may be AR glasses in the form of glasses worn on a user's face, an HMD worn on the user's head, or an AR helmet. However, the disclosure is not limited thereto. According to an embodiment, the AR device 1000 may be any type of electronic device, such as a mobile device, a smartphone, a laptop computer, a desktop computer, a tablet PC, an e-book terminal, a digital broadcast terminal, a personal digital assistant (PDA), a portable multimedia player (PMP), a navigation device, an MP3 player, a camcorder, an internet protocol television (IPTV), a digital TV (DTV), or a wearable device.

Referring to FIG. 2, the exercise machine 1000 may include the gaze tracking sensor 1100, a sensor unit 1200, a camera 1300, a processor 1400, a memory 1500, the depth sensor 1600, a storage 1700, and a display 1800. In FIG. 2, only essential components for describing an operation of the AR device 1000 are illustrated. The components included in the AR device 1000 are not limited to those illustrated in FIG. 2.

The gaze tracking sensor 1100 is a sensor that tracks a gaze direction of the user's eye. The gaze tracking sensor 1400 may detect the user's gaze direction by detecting an image of the user's pupil or detecting a direction in which illumination light such as near-infrared rays is reflected by the user's cornea or an amount of the illumination light. The gaze tracking sensor 1400 may include a left eye gaze tracking sensor and a right eye gaze tracking sensor, which may detect a gaze direction of the user's left eye and a gaze direction of the user's right eye, respectively. Detecting the user's gaze direction may include obtaining gaze information related to the user's gaze.

According to an embodiment, the gaze tracking sensor 1100 may include one or a plurality of infrared emitters 1110, a plurality of infrared detectors 1120, and a gaze tracking camera 1130. However, the disclosure is not limited thereto, and the gaze tracking sensor 1100 may include an infrared emitter 1110 and an infrared detector 1120, or may include the infrared emitter 1110 and the gaze tracking camera 1130.

A specific structure and a specific operation of the gaze tracking sensor 1100 will be described in detail with reference to FIGS. 5A through 5C.

The sensor unit 1200 is configured to sense a user input of pointing to or selecting an object in the real world. The sensor unit 1200 may include a hand tracker 1210, an input controller sensor 1220, and an inertial measurement sensor (IMU) 1230.

The hand tracker 1210 is a sensor configured to recognize an area or point pointed by a user's hand. According to an embodiment, the hand tracker 1210 may recognize the center point of the palm or back of the user's hand and obtain location coordinate information of the recognized center point. The hand tracker 1210 may obtain, in real time, location coordinate information of the center point that changes according to the movement of the hand. The hand tracker 1210 provides the processor 1400 with the obtained location coordinate information of the center point. An operation of the hand tracker 1210 will be described in detail with reference to FIG. 8.

The input controller sensor 1220 is a sensor configured to recognize the location of an input controller mounted on a part of the user's body or carried by the user. According to an embodiment, the input controller sensor 1220 may be paired with at least one of an inertial measurement sensor (e.g., a gyroscope, an accelerometer, or a magnetometer) capable of tracking relative and absolute locations between an input controller and the AR device 1000, a wireless communication module (e.g., UWB, WiFi, or Bluetooth), and a touch sensor (touch-sensitive surface) to obtain location coordinate values of the input controller.

The input controller sensor 1220 may obtain, in real time, location coordinate information of the input controller that moves according to the user's manipulation. The input controller sensor 1220 provides the processor 1400 with the obtained location coordinate information of the input controller. An operation of the input controller sensor 1220 will be described in detail with reference to FIG. 9.

The IMU 1230 is a sensor configured to measure the moving speed, direction, angle, and gravitational acceleration of a device through a combination of an accelerometer, a gyroscope, and a magnetometer. The IMU 1230 may measure linear acceleration of the AR device 1000 by using an accelerometer. According to an embodiment, the IMU 1230 may include a three-axis accelerometer that measures accelerations in longitudinal direction, lateral direction, and vertical direction, and a three-axis accelerometer that measures roll, pitch, and yaw angular velocities. According to an embodiment, the IMU 1230 may measure a rotational speed of the AR device 1000 by using a gyroscope.

The camera 1300 is configured to photograph a real object positioned in front of the AR device 1000 and obtain an image of the real object. The camera 1300 may provide the image of the real object to the processor 1400, and the processor 1400 may combine the image of the real object with depth value information of the real object obtained through the depth sensor 1600.

The processor 1400 may be electrically and/or physically connected to the gaze tracking sensor 1100, the sensor unit 1200, the camera 1300, the depth sensor 1600, the storage 1700, and the display 1800. The processor 1400 may include, but is not limited to, at least one hardware among a central processing unit, a microprocessor, a graphics processing unit, application specific integrated circuits (ASICs), digital signal processors (DSPs), digital signal processing devices (DSPDs), programmable logic devices (PLDs), or field programmable gate arrays (FPGAs).

The processor 1400 is illustrated as a single element in FIG. 2, but embodiments of the disclosure are not limited thereto. According to an embodiment of the disclosure, the processor 1400 may be provided as one or in plurality.

The memory 1500 may store a program including one or more instructions. According to an embodiment of the disclosure, at least one of instructions, an algorithm, a data structure, program code, or an application program readable by the processor 1400 may be stored in the memory 1500. The instructions, algorithm, data structure, and program code stored in the memory 1500 may be implemented in, for example, programming or scripting languages such as C, C++, Java, assembler, and the like.

The memory 1500 may include at least one type of hardware device among, for example, flash memory, random access memory (RAM), static random access memory (SRAM), read-only memory (ROM), flash memory, electrically erasable programmable read-only memory (EEPROM), and programmable read-only memory (PROM).

According to an embodiment below, the processor 1400 may be implemented by executing the instructions or program codes stored in the memory 1500.

The processor 1400 may obtain POI information about an object in the real world by tracking a POI of a user looking at or pointing to the object in the real world. According to an embodiment, the processor 1400 may obtain 2D location coordinate information of a gaze point according to the gaze direction of each of the user's left and right eyes from the gaze tracking sensor 1100, and obtain POI information of the user based on the 2D location coordinate information of the gaze point. According to another embodiment, the processor 1400 may obtain location coordinate information of the center point of the user's hand from the hand tracker 1210, and obtain POI information of the user based on the location coordinate value of the center point of the hand. According to another embodiment, the processor 1400 may obtain location coordinate information of the input controller worn or carried by the user from the input controller sensor 1220, and obtain POI information of the user based on the location coordinate information of the input controller.

The processor 1400 may calculate an ROI confidence level representing a degree to which at least one partial region within the entire region of the real world is predicted as an ROI, based on information related to a movement of the POI. According to an embodiment, the processor 1400 may calculate the ROI confidence level related to the at least one partial region within the entire region determined by an FOV through the AR device 1000, based on at least one of a moving speed, acceleration, fixation time, fixation number, and location of the POI.

According to an embodiment, the processor 1400 may calculate the ROI confidence level related to the at least one partial region within the entire region according to a proportional relationship with at least one of the fixation time and the fixation number of the POI. The 'fixation time' refers to the time during which the user's POI stays at location on a specific area or specific object, and the 'fixation number' refers to the number of times the user's POI stays at the location on the specific area or specific object for a preset threshold time or more.

According to an embodiment, the processor 1400 may calculate the ROI confidence level related to the at least one partial region within the entire region according to an inversely proportional relationship with at least one of the fixation time and the fixation number of the POI. According to another embodiment, the processor 1400 may calculate the ROI confidence level related to the at least one partial region within the entire region, based on the number of times the POI deviates from a preset area where the POI has stayed for a threshold of time. For example, as the number of times that the POI stays in a first area for a threshold of time or longer and then departs for a second area increases, the processor 1400 may calculate a low value as an ROI confidence level related to the first area.

The processor 1400 may determine an ROI within the entire region, based on the calculated ROI confidence level. According to an embodiment, the processor 1400 may determine, as an ROI, a partial region of which the calculated ROI confidence level is equal to or greater than a preset threshold among at least one partial region included in the entire region determined by the FOV of the AR device 1000. According to an embodiment, the processor 1400 may obtain a depth map image representing a depth value for the entire region within the FOV by using the camera 1300 and the depth sensor 1600, and may increase a resolution and a frame rate of a portion of the obtained depth map image corresponding to the ROI.

The processor 1400 may set a parameter for controlling an operation of the depth sensor 1600 that is used to obtain depth information of the object within the ROI. The parameter for controlling the operation of the depth sensor 1600 may include, for example, at least one of a light emission amount and a light emission location of the light emitter 1610 configured to radiate light to the ROI, power applied to the LC-based reflection mirror included in the light emitter 1610, and the on/off control parameters of the plurality of SPADs constituting the light receiving sensor 1620.

According to an embodiment, the processor 1400 may resize the ROI so that a preset threshold of amount of light and a preset threshold number of pattern light beams are radiated to the ROI by the light emitter 1610 of the depth sensor 1600. According to an embodiment, the processor 1400 may adjust the power applied to the LC-based reflection mirror by changing the arrangement of LC molecules included in an LC layer of the LC-based reflection mirror included in the light emitter 1610, so that the pattern light is radiated to the ROI. The processor 1400 may change the alignment angle of the LC molecules in an LC layer 1618LC by changing a control voltage of excitation electrodes 1618e-1 through 1618e-10 (see FIG. 12) for applying operating power to the LC-based reflection mirror, so that light is emitted by a light source 1612 (see FIG. 10), and may control light reflected by a reflective layer 1618r (see FIG. 12) to head toward the ROI. A specific embodiment in which the processor 1400 controls the light source 1612 and the LC layer 1618LC of the light emitter 1610 to change the amount of light emitted toward the ROI and the refractive index of the light will be described in detail with reference to FIGS. 10 through 12.

The processor 1400 may control an on/off operation of the light receiving sensor 1620 included in the depth sensor 1600. According to an embodiment, the light receiving sensor 1620 may be divided into a plurality of sections, each of which may include a plurality of SPADs. According to an embodiment, the processor 1400 may sequentially set sections disposed at a location corresponding to the ROI among the plurality of sections of the light receiving sensor 1620 to an on state according to a clock signal so that the sections receive light reflected by a target, and may maintain sections disposed at a location not corresponding to the ROI in an off state. According to an embodiment, the processor 1400 may control at least one SPAD not receiving light reflected by an object located within the ROI, among the plurality of SPADs included in the sections disposed at the location corresponding to the ROI, to be disabled. A specific embodiment in which the processor 1400 controls an operation of the light receiving sensor 1620 will be described in detail with reference to FIGS. 13 and 14.

The processor 1400 may determine a light transmission signal intensity (Tx intensity) of the light emitter 1610, based on a photon histogram for each pixel received by the light receiving sensor 1620. According to an embodiment, the processor 1400 may identify a peak value of at least one of the gradient of the received photons, a total sum of the photons, and a Z-score from the photon histogram for each pixel, and may determine a minimum Tx intensity capable of identifying the peak value. A specific embodiment in which the processor 1400 determines the light Tx intensity of the light emitter 1610, based on the photon histogram for each pixel, will be described in detail later with reference to FIG. 15.

The depth sensor 1600 is configured to obtain depth information about an object. The 'depth information' refers to information about a distance to a specific object in the real world. As the distance from the depth sensor 1600 to the object increases, a depth value increases, and, as the distance decreases, the depth value decreases.

The depth sensor 1600 may be a TOF sensor that radiates pattern light to the object by using a light source and obtains depth information based on a time taken for the radiated pattern light to be reflected by the object and detected again, that is, a flight time. In this case, the depth sensor 1600 may include the light emitter 1610 and the light receiving sensor 1620.

The light emitter 1610 is configured to generate light and radiate the light in a direction toward the object. According to an embodiment, the light emitter 1610 may include a light source that emits laser light or infrared light (IR), and an LC-based reflection mirror configured to adjust the refractive index of light by changing the arrangement of LC molecules. According to an embodiment, the light emitter 1610 may further include micro electro mechanical systems (MEMSs) that are mechanical reflection mirrors that replicate light emitted from a light source and reflects the light to change the direction of light.

The light receiving sensor 1620 is configured to receive light that is radiated to the object by the light emitter 1610 and reflected and fed back by the object. According to an embodiment, the light receiving sensor 1620 may include a plurality of SPADs. An SPAD is a pixel-structured light-receiving sensor that uses avalanche multiplication that amplifies electrons like an avalanche from an incident single photon.

Specific structures of the light emitter 1610 and the light receiving sensor 1620 of the depth sensor 1600 will be described in detail with reference to FIG. 10. The depth sensor 1600 has been described above as being implemented as a TOF sensor, but embodiments of the disclosure are not limited thereto. According to another embodiment, the depth sensor 1600 may be configured as a sensor that obtains depth information by using at least one of a structured light method and a stereo image method.

The storage 1700 stores the depth information of the object measured by the depth sensor 1600. According to an embodiment, the storage 1700 may store a depth value measured according to location coordinates of an object included in the entire region or the ROI. The storage 1700 may be implemented as non-volatile memory. The non-volatile memory refers to a storage medium that may store and maintain information even when power is not supplied and may use the stored information again when power is supplied. The non-volatile memory may include, for example, at least one of a flash memory, a hard disk, a solid state drive (SSD), a multimedia card micro type, and a card type memory (e.g., SD or XD memory), a ROM, a magnetic memory, a magnetic disk, or an optical disk.

The display 1800 is configured to display the depth map generated by the processor 1400. The display 1800 may include at least one of, for example, a liquid crystal display (LCD), a thin film transistor-liquid crystal display (TFT-LCD), an organic light-emitting diode (OLED), a flexible display, a three-dimensional (3D) display, and an electrophoretic display.

Figure 3:
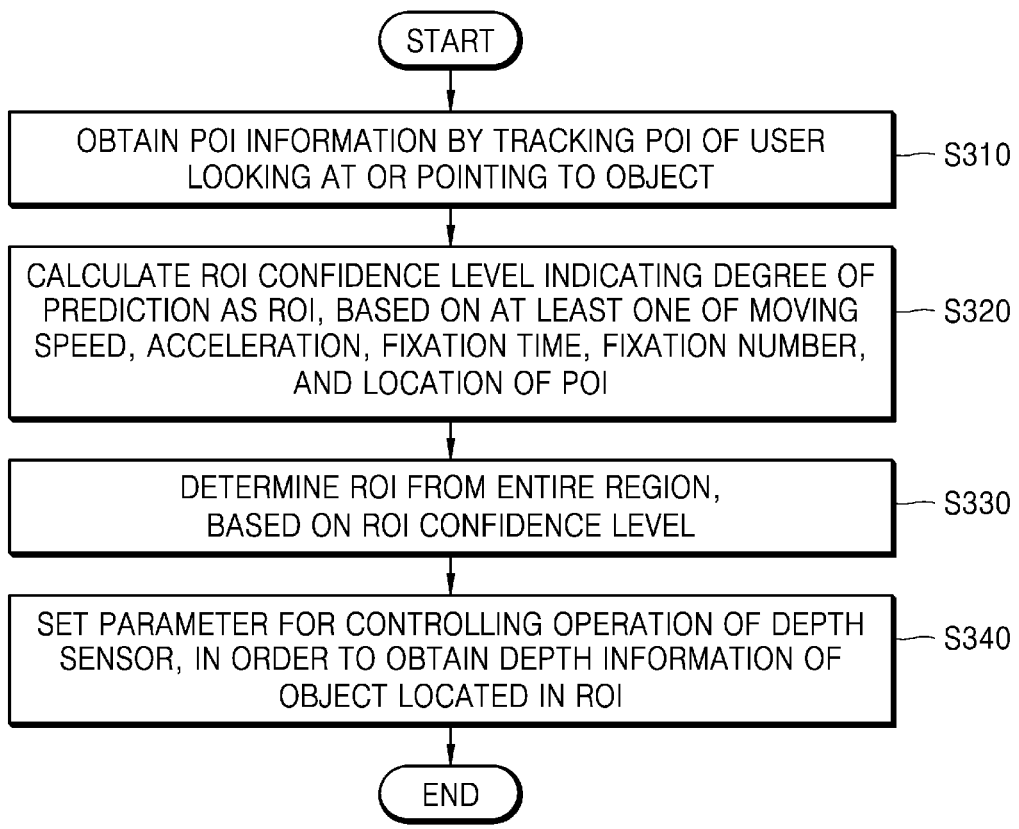
FIG. 3 is a flowchart of an operation method of the AR device, according to an embodiment of the disclosure.

When the AR device 1000 is composed of glasses-type AR glasses, the display 1800 may further include an optical engine projecting a virtual image. The optical engine may be configured to generate light of a virtual image, and may be composed of a projector including an image panel, an illumination optical system, a projection optical system, and the like. The optical engine may be placed in the frame or temples of the glasses-type AR glasses, for example FIG. 3 is a flowchart of an operation method of the AR device 1000 according to an embodiment of the disclosure.

In operation S310, the AR device 1000 obtains POI information by tracking a POI of a user looking at or pointing to an object. According to an embodiment, the AR device 1000 may obtain information about the gaze direction of the user's left eye and the gaze direction of the user's right eye by using the gaze tracking sensor 1100 (see FIG. 2), and detect a gaze point at which the gaze direction of the user's left eye and the gaze direction of the user's right eye converge. The AR device 1000 may obtain POI information of the user, based on the 2D location coordinate information of the gaze point. According to another embodiment, the AR device 1000 may obtain location coordinate information of the center point of the user's hand from the hand tracker 1210 of FIG. 2, and may obtain POI information of the user based on the location coordinate value of the center point of the hand. According to another embodiment, the AR device 1000 may obtain location coordinate information of the input controller worn or carried by the user from the input controller sensor 1220 of FIG. 2, and may obtain POI information of the user based on the location coordinate information of the input controller.

In operation S320, the AR device 1000 may calculate an ROI confidence level indicating a degree of prediction as an ROI, based on at least one of the moving speed, acceleration, fixation time, fixation number, and location of the POI. According to an embodiment, the AR device 1000 may calculate a ROI confidence level of at least one partial region included in the entire region determined by the FOV of the space of the real object. According to an embodiment, the AR device 1000 may calculate the ROI confidence level related to the at least one partial region within the entire region according to a proportional relationship with at least one of the fixation time and the fixation number of the POI.

According to an embodiment, the AR device 1000 may calculate the ROI confidence level related to the at least one partial region within the entire region according to an inversely proportional relationship with at least one of the fixation time and the fixation number of the POI.

In operation S330, the AR device 1000 determines the ROI from the entire region, based on the ROI confidence level. According to an embodiment, the AR device 1000 may determine, as the ROI, a partial region of which the calculated ROI confidence level is equal to or greater than a preset threshold among the at least one partial region included in the entire region determined by the FOV.

According to an embodiment, the AR device 1000 may increase a resolution and a frame rate of a portion of a depth map image obtained with respect to the entire region corresponding to the ROI.

In operation S340, the AR device 1000 sets a parameter for controlling an operation of a depth sensor, in order to obtain depth information of an object located in the ROI. According to an embodiment, the AR device 1000 may resize the ROI so that a preset threshold amount of light and a preset number of pattern light are radiated by the light emitter. According to an embodiment, the AR device 1000 may adjust the power applied to the LC-based reflection mirror so that the pattern light is radiated to the LC-based reflection mirror by changing the arrangement of LC molecules included in an LC layer of the LC-based reflection mirror included in the light emitter 1610. According to an embodiment, the AR device 1000 may control an on/off operation of the light receiving sensor 1620 (see FIG. 2) included in the depth sensor. According to an embodiment, the AR device 1000 may sequentially set sections disposed at a location corresponding to the ROI among the plurality of sections of the light receiving sensor 1620 to an on state according to a clock signal so that the sections receive light reflected by a target, and may maintain sections disposed at a location not corresponding to the ROI in an off state. According to an embodiment, the AR device 1000 may control at least one SPAD not receiving light reflected by an object located within the ROI, among the plurality of SPADs included in the sections disposed at the location corresponding to the ROI, to be disabled.

Figure 4:
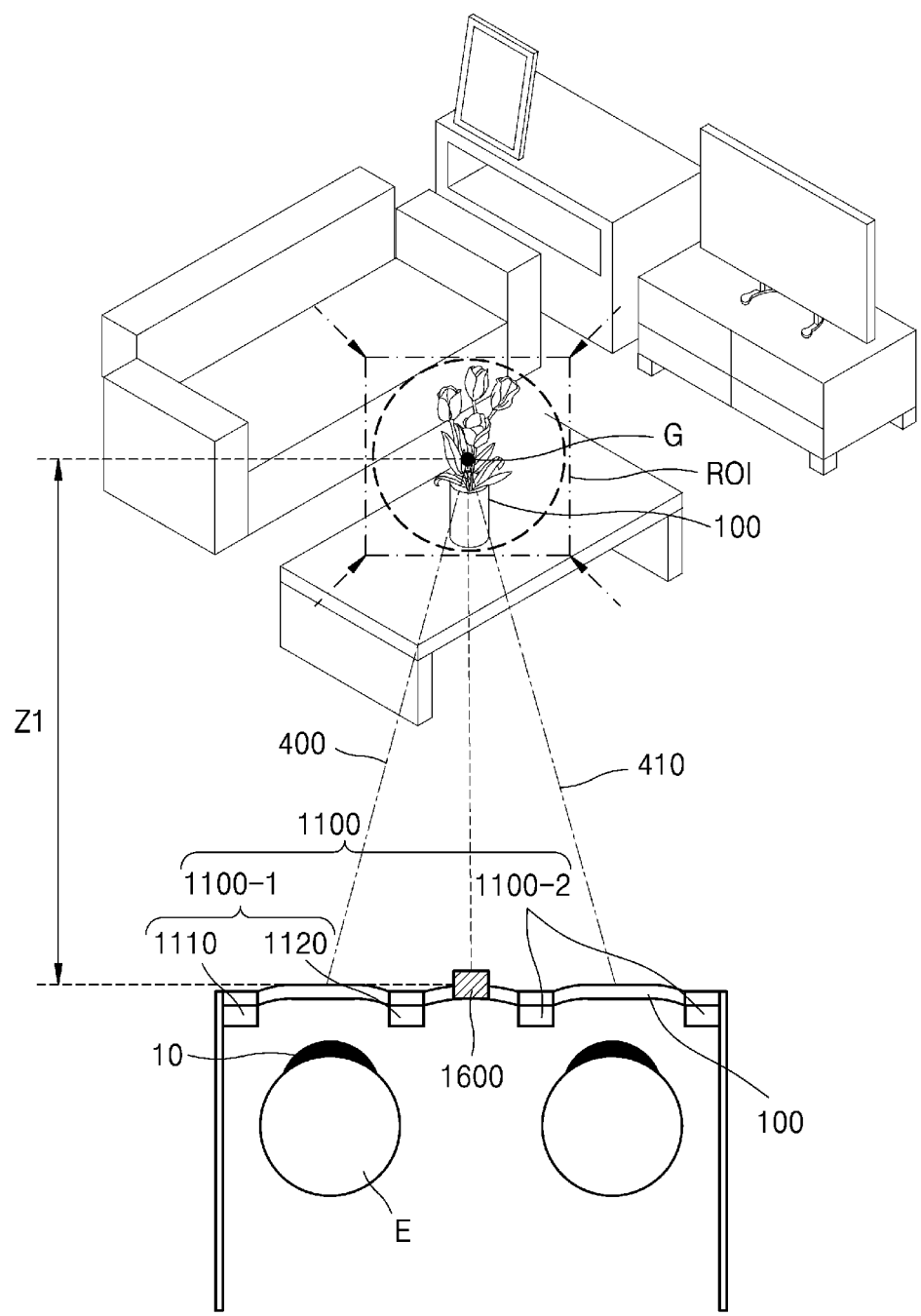
FIG. 4 is a diagram illustrating a method, performed by an AR device, of determining a region of interest (ROI) in a gaze direction of a user, according to an embodiment of the disclosure.

FIG. 4 is a diagram illustrating a method, performed by the AR device 1000, of determining an ROI in a gaze direction of a user, according to an embodiment of the disclosure.

Referring to FIG. 4, the AR device 1000 may track gaze directions 400 and 410 of the user by using the gaze tracking sensor 1100, and may obtain information about the gaze directions 400 and 410. A 'gaze' refers to a direction of looking, and 'eye tracking' refers to a process of measuring the user's gaze (e.g., a gaze point G) and may be performed by tracking the locations and movements of both eyes.

In the embodiment shown in FIG. 4, the gaze tracking sensor 1100 may include a first gaze tracking sensor 1100-1 that obtains information about a gaze direction 400 of the user's left eye, and a second gaze tracking sensor 1100-2 that obtains information about a gaze direction 410 of the user's right eye. The first eye tracking sensor 1100-1 and the second eye tracking sensor 1100-2 have the same structures and operate in the same manners. Accordingly, FIG. 4 will be described based on the first gaze tracking sensor 1100-1.

The first gaze tracking sensor 1100-1 may include an infrared emitter 1110 for radiating light to the eye of the user, and an infrared detector 1120 for sensing light. According to an embodiment, the infrared emitter 1110 may radiate infrared light. The infrared emitter 1110 may include a light source for generating light and a scanning mirror for controlling a direction of the light provided by the light source. The scanning mirror may control the light provided by the light source to be directed toward the user's eye E (e.g., cornea). The scanning mirror may include a structure capable of mechanically changing the angle of reflection so that the light provided by the light source is reflected toward the user's eye E, and may scan a region including the cornea by using the light provided by the light source according to the changed angle of reflection.

The infrared detector 1120 may detect infrared light reflected by the user's eye E, and may measure the amount of detected light. For example, when light is reflected by the center of the user's cornea, the amount of light detected by the infrared detector 1120 may be maximum. Accordingly, when the amount of light detected by the infrared detector 1120 is maximum, the first gaze tracking sensor 1100-1 may determine the gaze direction 400 of the user's eye E, based on a point where the infrared light incident on the user's eye is reflected. For example, when the amount of light is maximum, the first gaze tracking sensor 1100-1 may determine a direction connecting the point where the infrared light incident on the user's eye is reflected to a center point of the user's eye E, as the gaze direction 410 of the user's eye (e.g., the user's left eye).

The second gaze tracking sensor 1100-2 may determine the gaze direction 410 of the user's right eye in the same way as the operation of the first gaze tracking sensor 1100-1. Accordingly, redundant description of the operation method of the second gaze tracking sensor 1100-2 will be omitted.

The AR device 1000 may detect the gaze point G at which the left eye gaze direction 400 and the right eye gaze direction 410 converge according to binocular disparity. According to an embodiment, the gaze point may be detected by a triangulate method. The AR device 1000 may obtain the 2D location coordinate values of the gaze point G. According to an embodiment, the AR device 1000 may calculate a distance between the gaze point G and the depth sensor 1600, namely, a depth value Z1, based on a distance between both eyes, the first gaze direction 400, and the second gaze direction 410. A specific embodiment in which the AR device 1000 obtains information on the gaze directions 400 and 410 of both eyes measured using the eye tracking sensor 1100 and information of the depth value Z1 of the gaze point G by using an equation according to a geometrical arrangement will be described in detail with reference to FIGS. 6A and 6B.

According to an embodiment, the AR device 1000 may estimate the depth value Z1 of the gaze point G, based on an angle formed by the gaze direction 400 of the left eye and the gaze direction 410 of the right eye. For example, the smaller the angle between the left eye gaze direction 400 and the right eye gaze direction 410 is, the greater the distance to the gaze point G, namely, the depth value Z1, is, and, the larger the angle between the left eye gaze direction 400 and the right eye gaze direction 410 is, the smaller the size of the depth value Z1 is.

The AR device 1000 may calculate an ROI confidence level related to at least one partial region among the entire region, based on at least one of the moving speed, acceleration, fixation time, fixation number, and location of the gaze point G. The AR device 1000 may determine an ROI, based on the calculated ROI confidence level. Because a method, performed by the AR device 1000, of calculating the ROI confidence level and the ROI is the same as that described with reference to FIGS. 1 through 3, a redundant description thereof will be omitted.

Figure 5A:
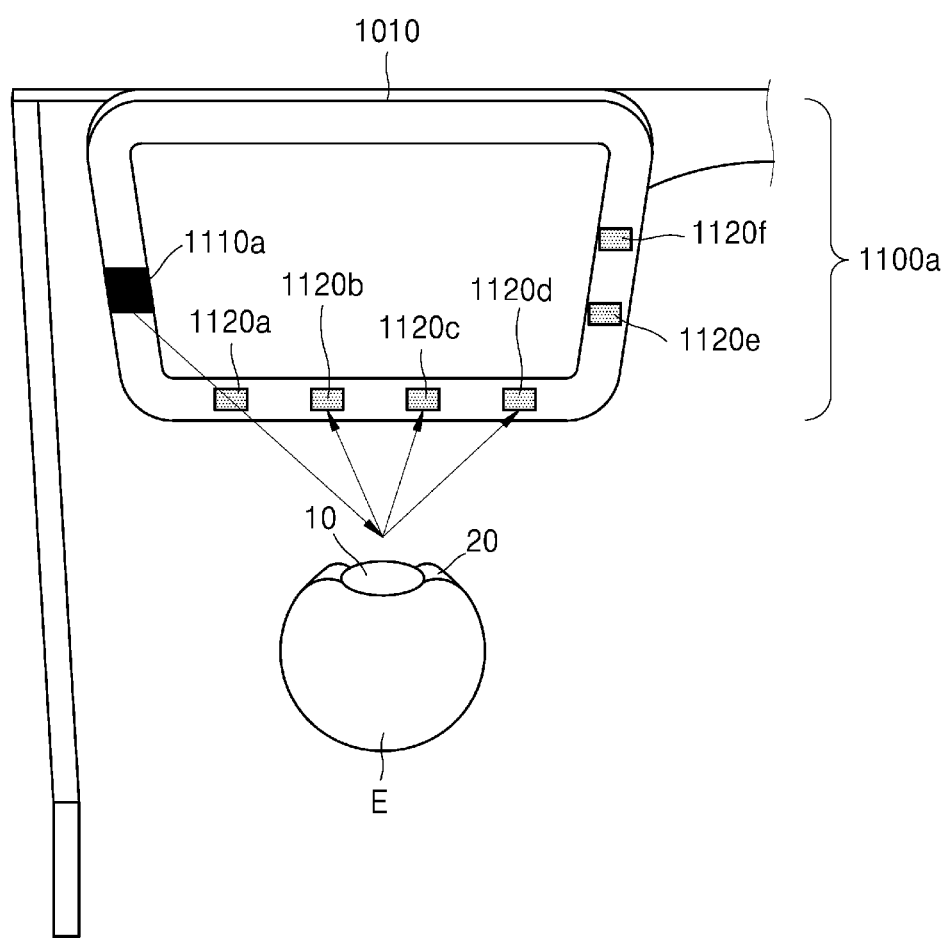
FIG. 5A is a diagram of a gaze tracking sensor, which is a component of the AR device, according to an embodiment of the disclosure.

FIG. 5A is a diagram of a gaze tracking sensor 1100a, which is a component of the AR device 1000, according to an embodiment of the disclosure.

Referring to FIG. 5A, the gaze tracking sensor 1100a may include an infrared emitter 1110a and a plurality of infrared detectors 1120a through 1120f. Although six infrared detectors 1120a through 1120f are illustrated in FIG. 5A, this is for convenience of description, and the number of infrared detectors 1120a through 1120f is not limited thereto.

The infrared emitter 1110a may emit infrared light to the cornea in which the lens of the eye E is positioned, and the plurality of infrared detectors 1120a through 1120f may detect the infrared light reflected by the cornea. According to an embodiment, the gaze tracking sensor 1400a may obtain information about an amount of infrared light detected by each of the plurality of infrared detectors 1120a through 1120f, and may obtain information about a gaze direction of the user's eye E based on the obtained amount of infrared light. The gaze tracking sensor 1100a may provide the obtained information about the gaze direction to the processor 1400 (see FIG. 2). For example, the information about the gaze direction obtained by the gaze tracking sensor 1100a may be gaze angle information in horizontal and vertical directions of the left eye and gaze angle information in horizontal and vertical directions of the right eye.

Although it is described as an example that the gaze tracking sensor 1100a according to the present embodiment uses an infrared (IR) scanner method using infrared illumination light, the disclosure is not limited thereto. As another example, the gaze tracking sensor 1100a may include an image sensor that captures an image of a person's pupil 10 and an image of iris 20. A gaze tracking sensor 1100b including an image sensor will be described in detail with reference to FIG. 5B.

Figure 5B:
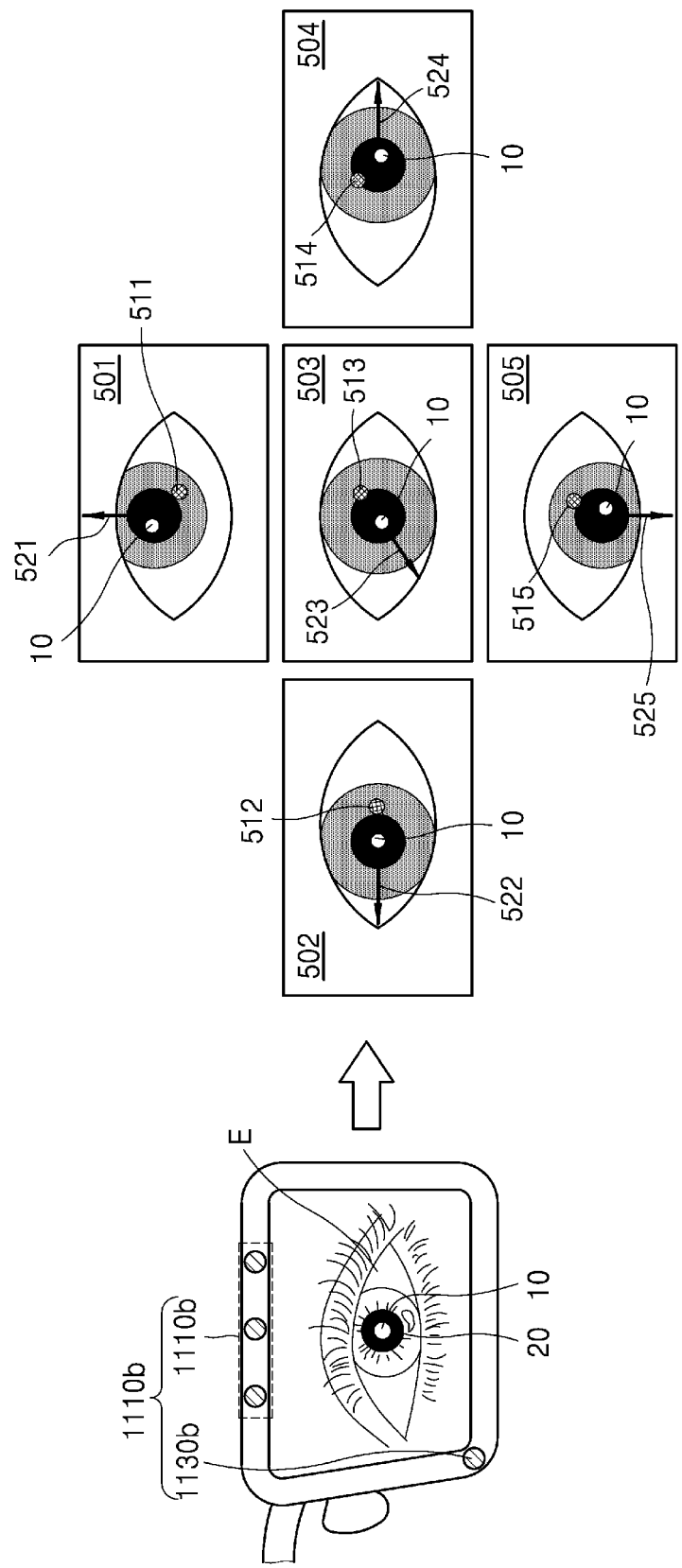
FIG. 5B is a diagram of a gaze tracking sensor, which is a component of the AR device, according to an embodiment of the disclosure.

FIG. 5B is a diagram of a gaze tracking sensor 1100b, which is a component of the AR device 1000, according to an embodiment of the disclosure.

Referring to FIG. 5B, the gaze tracking sensor 1100b may track the user's gaze, based on positions of reflected light beams 511, 512, 513, 514, and 515 reflected by the user's eye E, and thus may obtain information about the gaze direction. The gaze tracking sensor 1100b may include a light source 1110b and a camera 1130b.

The light source 1110b may include an infrared light-emitting diode (IR LED). In the embodiment illustrated in FIG. 5B, the light source 1110b may include a plurality of LEDs arranged at different positions. The light source 1110b may provide light (e.g., infrared light) to the user's eye E when an image of the user's eye E is captured. Because the light is provided to the user's eye E, reflected light that is reflected by the user's eye E may be generated.

The camera 1130b may be configured as at least one camera. The camera 1130b may be implemented as an IR camera. The AR device may track a gaze of the user's eye E by using eye images 501 through 505 of the user's eye E captured by the camera 1130b. For example, the gaze tracking sensor 1100b may track the user's gaze by detecting the pupil 10 and the reflected light beams 511 through 515 from the eye images 501 through 505 of the user, and thus may obtain a gaze vector. The gaze tracking sensor 1100b may detect positions of the pupil 10 and the reflected light beams 511 through 515 in the eye images 501 through 505 of the user, and may determine the gaze direction of the user's eye E, based on a relationship between the position of the pupil 10 and the positions of the reflected light beams 511 through 515.

For example, the gaze tracking sensor 1100*b* may detect the pupil 10 and the reflected light beam 511 in a captured first eye image 501, and may determine a gaze direction 521 of the user's eye E, based on a relationship between the position of the pupil 10 and the position of the reflected light beam 511. Likewise, the gaze tracking sensor 1100*b* may detect the pupil 10 and the reflected light beams 512, 513, 514, and 515 from second, third, fourth, and fifth eye images 502, 503, 504, and 505, respectively, and determine gaze directions 522, 523, 524, and 525 of the user's eye E, based on relationships between the position of the pupil 10 and the positions of the reflected light beams 512, 513, 514, and 515.

According to an embodiment, the gaze tracking sensor 1100*b* may obtain a gaze vector, based on information about the determined gaze direction. The gaze tracking sensor 1100*b* may provide, to the processor 1400 (see FIG. 2), a vector value of the obtained gaze vector and data about a direction of the gaze vector.

According to another embodiment, the gaze tracking sensor 1100*b* may provide, to the processor 1400 (see FIG. 2), only coordinate values of the position of the pupil 10 and the positions of the reflected light beams 511 through 515 detected from the plurality of eye images 501 through 505, and the processor 1400 may calculate the gaze vector of the user's eye E, based on the coordinate values obtained by the gaze tracking sensor 1100*b*.

Figure 5C:
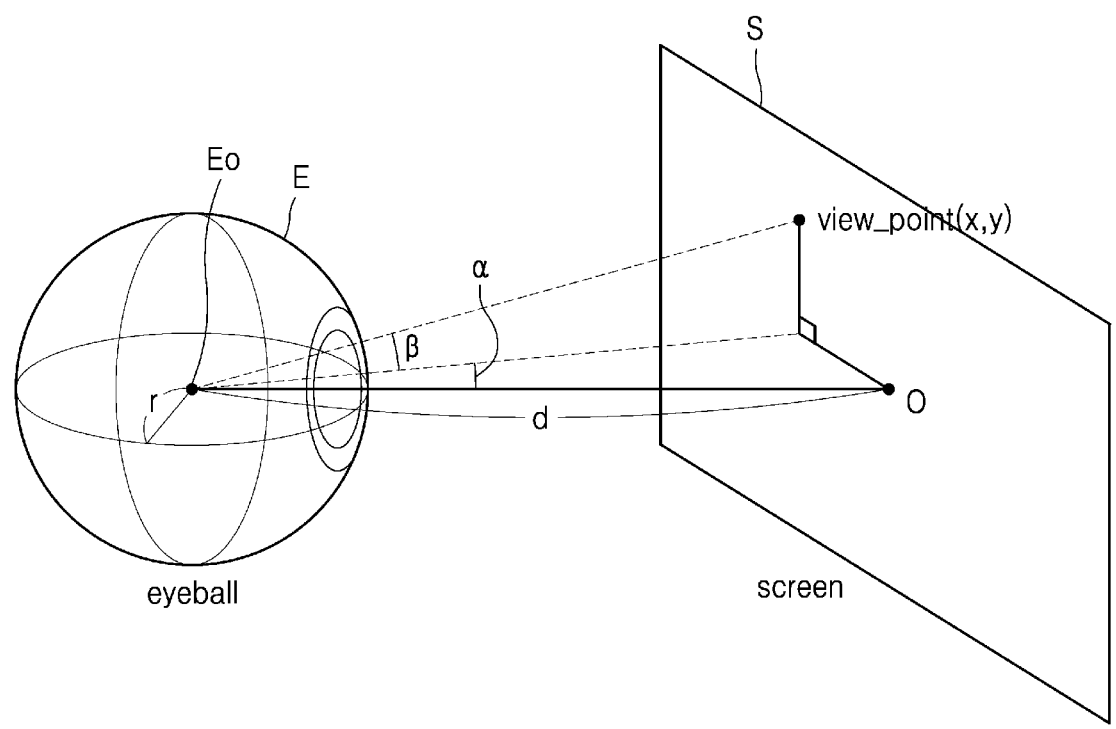
FIG. 5C is a diagram illustrating a three-dimensional (3D) eyeball model for a user's gaze direction.

FIG. 5C is a diagram illustrating a 3D eyeball model for a user's gaze direction.

Referring to FIG. 5C, tracking of a gaze direction according to an embodiment may be performed based on a 3D eye model for a gaze. In the 3D eye model for the gaze, when it is assumed that an eyeball has a perfect spherical shape and the eyeball rotates in an ideal space according to the gaze, the gaze may be mathematically modeled as illustrated in the following equation.

$$x = d \cdot \tan\alpha \qquad \text{[Equation 1]}$$

$$y = d \cdot \sec\alpha \cdot \tan\beta$$

$$\beta = \sin^{-1}\frac{\Delta y}{r} \qquad \text{[Equation 2]}$$

$$\alpha = \sin^{-1}\frac{\Delta x}{r\cos\beta}$$

In Equation 1, d denotes a distance between a center $E_o$ of a user's eye and a virtual screen S, a denotes an angle at which the user's eye rotates in an x-axis (horizontal axis) direction, based on a case in which the user's eye directly gazes at the virtual screen S, and R denotes an angle at which the user's eye rotates in a y-axis (vertical axis) direction, based on a case in which the user's eye directly gazes at the virtual screen S. In Equation 2, r denotes a radius of a sphere when it is assumed that the user's eye has a spherical shape.

The gaze tracking sensor 1100*a* and 1100*b* (see FIGS. 5A and 5B) according to an embodiment may measure rotational degrees (e.g., $\alpha$ and $\beta$) of the user's eye E, and the AR device 1000 may calculate 2D location coordinates values (x, y) in a gaze direction of the user's eye E on the virtual screen S by using the rotational degrees ($\alpha$ and $\beta$) of the user's eye E. The rotational degrees ($\alpha$ and $\beta$) of the eye E may be understood as gaze angle information in horizontal and vertical directions of the eye E.

An actual eye movement is not an ideal 3D rotational movement. In particular, the relaxation/contraction of eye muscles greatly generates a gaze in left and right directions, so that an error may occur during estimation of a gaze in a vertical direction with respect to the gaze in the left and right directions based on an ideal 3D rotational eyeball model. Due to the error, the AR device 1000 causes the user to gaze at a random point, compares gaze direction values estimated through the gaze tracking sensors 1100*a* and 1100*b* with an actual gaze direction value for the point, and statistically processes the gaze direction values, and thus, accuracy may be improved.

Figure 6A:
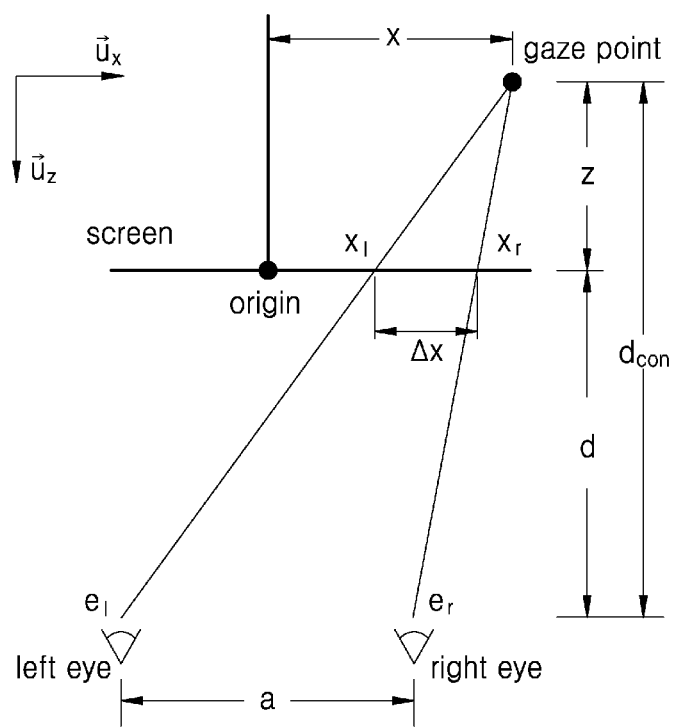
FIG. 6A is a diagram for explaining a method, performed by an AR device, of calculating a gaze point from information about a gaze direction measured by a gaze tracking sensor, according to an embodiment of the disclosure.
Figure 6B:
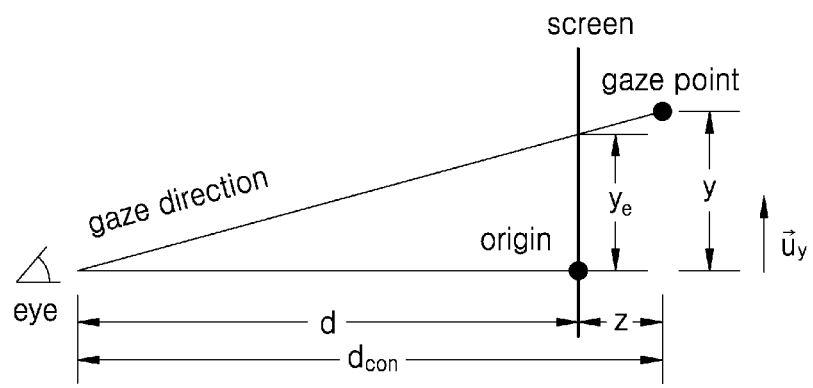
FIG. 6B is a diagram for explaining a method, performed by an AR device, of calculating a gaze point from information about a gaze direction measured by a gaze tracking sensor, according to an embodiment of the disclosure.

FIGS. 6A and 6B are diagrams for explaining a method, performed by the AR device 1000, of calculating a gaze point from information about a gaze direction measured by a gaze tracking sensor, according to an embodiment of the disclosure.

FIG. 6A illustrates a relationship between gaze angles from left and right eyes and a gaze point. FIG. 6B illustrates a relationship between a gaze angle in an upward gaze direction and a gaze point.

Referring to FIGS. 6A and 6B, a focal length may be estimated through a difference in gaze directions (or gaze coordinates) of both eyes obtained through the gaze tracking sensor 1100 (see FIG. 2). When a focal length to the gaze point is calculated, gaze axes of both eyes may not meet each other. In this case, assuming that both eyes are at the same height, coordinates of a vertical axis (y-axis) may be calculated as an average of vertical axis (y-axis) coordinates of both eyes. For example, a distance a between both eyes may be assumed to be 7 cm. The following equation may be obtained by using a proportional expression through the geometrical assumption described above.

$$\frac{-z}{\Delta x} = \frac{d-z}{a} \qquad \text{[Equation 3]}$$

In Equation 3, the distance d between both eyes of the user and a virtual screen and the distance a between the eyes are required. The distance d may be obtained by measuring a rotation angle of an eyeball by using a gaze image that the user looks straight ahead. As a result, a convergence distance $d_{con}$, which is a distance to the gaze point, is given by the following equation. z denotes a distance between the virtual screen and the gaze point.

$$d_{con} = d + z = d + \frac{\Delta x d}{\Delta x - a} = \left(1 + \frac{\Delta x}{\Delta x - a}\right) \cdot d \qquad \text{[Equation 4]}$$

In Equation 4, $\beta$ is an interval in a horizontal direction of gaze coordinates of both eyes on the virtual screen S, and may be obtained through respective gaze directions (gaze angles) of the user's left and right eyes, as illustrated in Equations 3 and 4 above.

The AR device 1000 may obtain the depth value Z1 of FIG. 4, which is a distance to a point where the depth sensor 1600 (see FIG. 4) and the user's both eyes converge, based on a sum of the distance z and the distance d.

Figure 7:
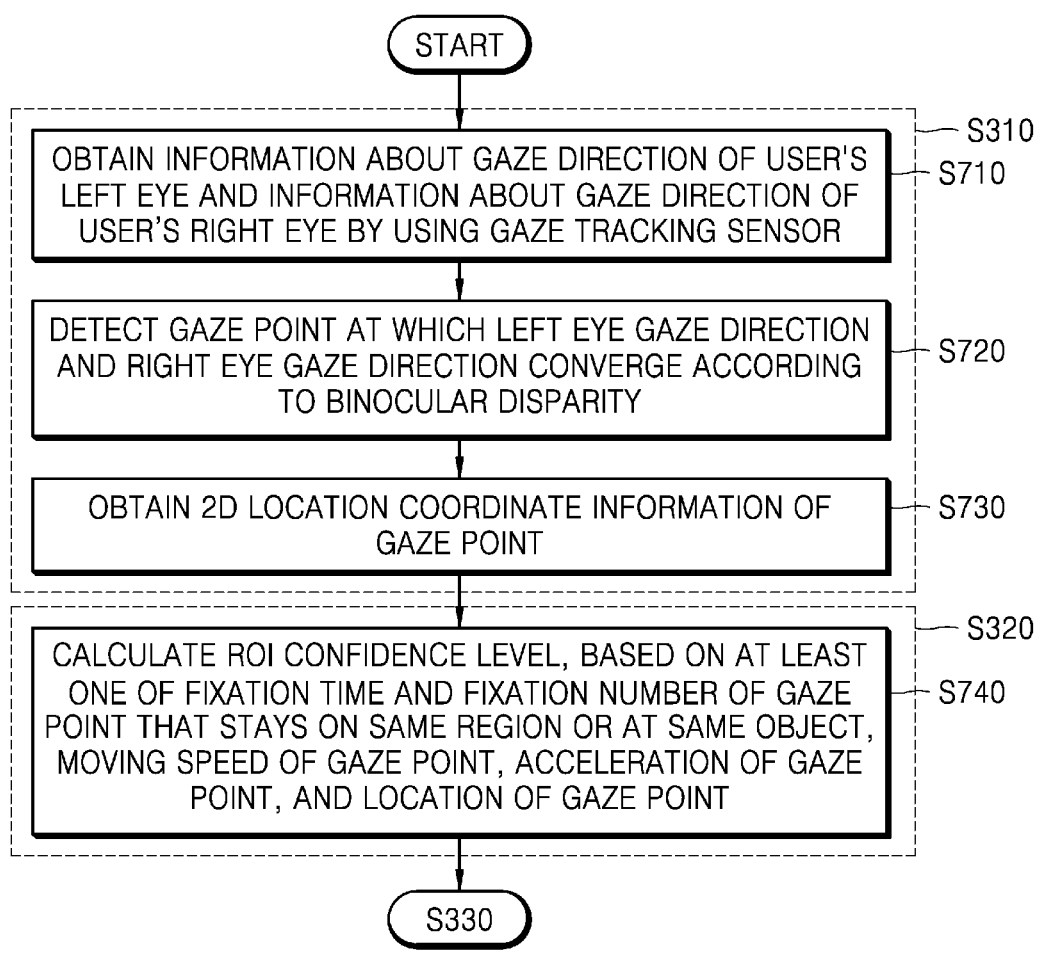
FIG. 7 is a flowchart of a method, performed by an AR device, of calculating an ROI confidence level, based on a gaze point according to a gaze direction of a user, according to an embodiment of the disclosure.

FIG. 7 is a flowchart of a method, performed by the AR device 1000, of calculating an ROI confidence level, based on a gaze point according to a gaze direction of a user, according to an embodiment of the disclosure.

Operations S710 through S730 among the operations shown in FIG. 7 are operations that constitute operation S310 of FIG. 3. Operation S740 of FIG. 7 is a detailed version of operation S320 of FIG. 3. Operations S330 of FIG. 3 may be performed after operation S740 is performed.

In operation S710, the AR device 1000 obtains information about the gaze direction of the user's left eye and information about the gaze direction of the user's right eye by using the gaze tracking sensor.

In operation S720, the AR device 1000 may detect a gaze point at which the left eye gaze direction and the right eye gaze direction converge according to binocular disparity.

In operation S730, the AR device 1000 obtains 2D location coordinate information of the gaze point. A method, performed by the AR device 1000, of obtaining the 2D location coordinate information of the gaze point from the information about the gaze directions of the left eye and the right eye is the same as that described above with reference to FIGS. 6A and 6B, and thus a repeated description thereof is omitted.

In operation S740, the AR device 1000 may calculate an ROI confidence level for at least one partial region included in the entire region within the FOV, based on at least one of fixation time and fixation number of the gaze point that stays on the same region or the same object, a moving speed of the gaze point, acceleration of the gaze point, and location deviation of the gaze point.

Figure 8:
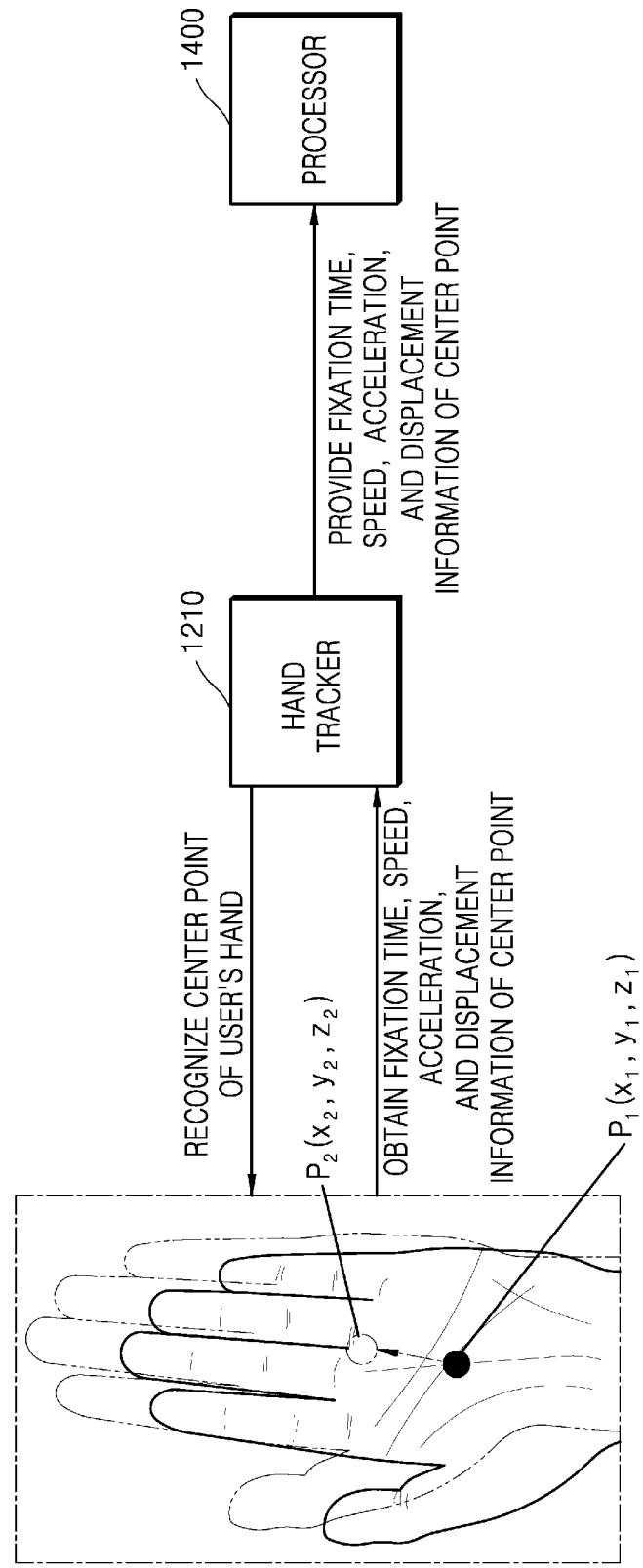
FIG. 8 is a diagram for explaining a method, performed by an AR device, of calculating an ROI confidence level according to the location of a user's hand, according to an embodiment of the disclosure.

FIG. 8 is a diagram for explaining a method, performed by the AR device 1000, of calculating an ROI confidence level according to the location of a user's hand, according to an embodiment of the disclosure.

The hand tracker 1210 is a sensor configured to recognize an area or point pointed by a user's hand. Referring to FIG. 8, the hand tracker 1210 may recognize the center point of the user's hand and obtain location information of the recognized center point. In the embodiment shown in FIG. 8, the hand tracker 1210 may obtain 3D location coordinate values $(x_1, y_1, z_1)$ of a first location $P_1$, which is the location of the center point of the hand. The hand tracker 1210 may track, in real time, the location of the center point of the hand, and obtain location coordinate information of the center point in real time. For example, the hand tracker 1210 may obtain, in real time, 3D location coordinate values $(x_2, y_2, z_2)$ of a center point of the hand moved to a second location $P_2$.

The hand tracker 1210 may obtain movement-related information of the center point including at least one of fixation time, speed, acceleration, and displacement information. The 'fixation time of the center point' refers to the time during which the center point stays on the same area. The 'speed of the center point' and the 'acceleration of the center point' may refer to, for example, a speed and acceleration at which the center point moves from the first position $P_1$ to the second position $P_2$, respectively. The 'displacement of the center point' refers to a movement in which the center point of the hand stays in a region within a preset range from a current position, for example, the first position $P_1$, and then departs to a location outside the preset range (e.g., the second location $P_2$).

The hand tracker 1210 may provide at least one of fixation time, speed, acceleration, and displacement information of the center point of the hand to the processor 1400. The processor 1400 may calculate an ROI confidence level indicating a degree to which a location or region pointed by the center point of the hand may be predicted as an ROI, based on at least one of the fixation time, speed, acceleration, and displacement information of the center point of the hand obtained by the hand tracker 1210.

Figure 9:
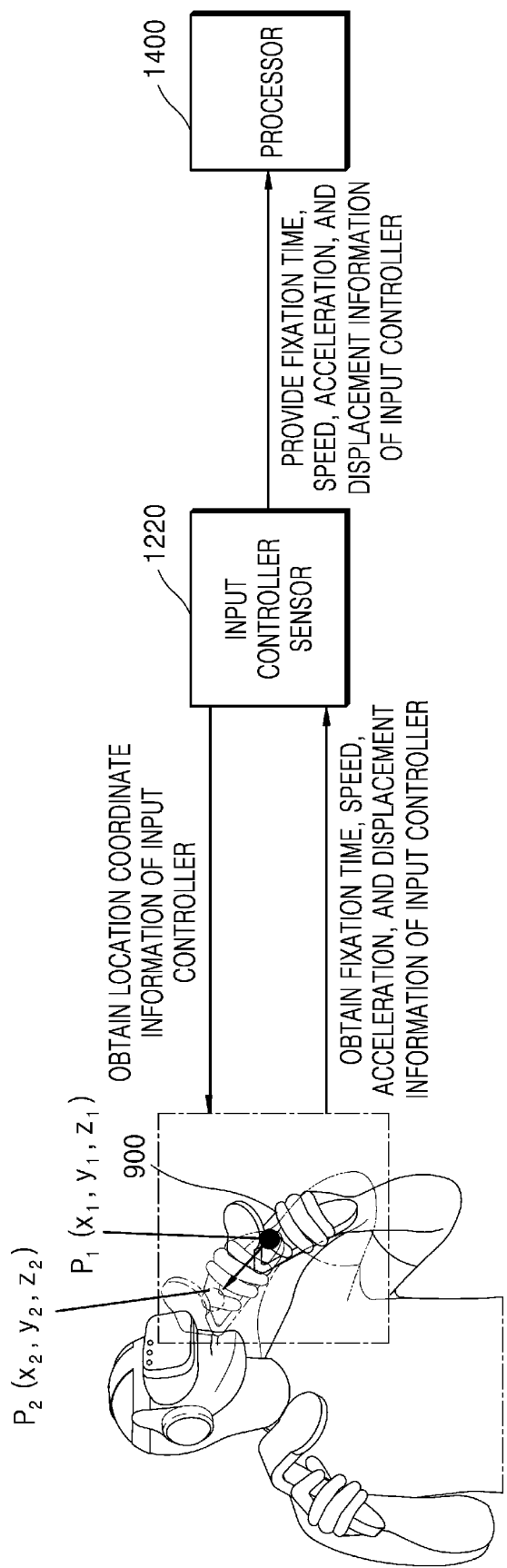
FIG. 9 is a diagram for explaining a method, performed by an AR device, of calculating an ROI confidence level according to the location of an input controller, according to an embodiment of the disclosure.

FIG. 9 is a diagram for explaining a method, performed by the AR device 1000, of calculating an ROI confidence level according to the location of an input controller 900, according to an embodiment of the disclosure.

The input controller sensor 1220 is a sensor configured to recognize the location of the input controller 900 mounted on a part of the user's body or carried by the user. According to an embodiment, the input controller sensor 1220 may be paired with an inertial measurement sensor, a wireless communication module, and a touch sensor for tracking the position of the input controller 900, and may be configured to obtain location coordinate values of the input controller 900. Referring to FIG. 9, the input controller sensor 1220 may obtain, in real time, location coordinate information of the input controller 900 that moves according to the user's manipulation. In the embodiment shown in FIG. 9, the hand tracker 1220 may obtain 3D location coordinate values $(x_1, y_1, z_1)$ of a first location $P_1$ of the input controller 900. The input controller sensor 1220 may track the location of the input controller 900 in real time and may obtain location coordinate information of the input controller 900 in real time. For example, the input controller sensor 1220 may obtain, in real time, 3D location coordinate values $(x_2, y_2, z_2)$ of the input controller 900 moved to a second location $P_2$.

The input controller sensor 1220 may obtain movement-related information including at least one of fixation time, speed, acceleration, and displacement information of the input controller 900.

The input controller sensor 1220 may provide at least one of the fixation time, speed, acceleration, and displacement information of the input controller 900 to the processor 1400. The processor 1400 may calculate an ROI confidence level indicating a degree to which a location or region pointed by the input controller 900 may be predicted as an ROI, based on at least one of the fixation time, speed, acceleration, and displacement information of the input controller 900 obtained by the input controller sensor 1220.

Figure 10:
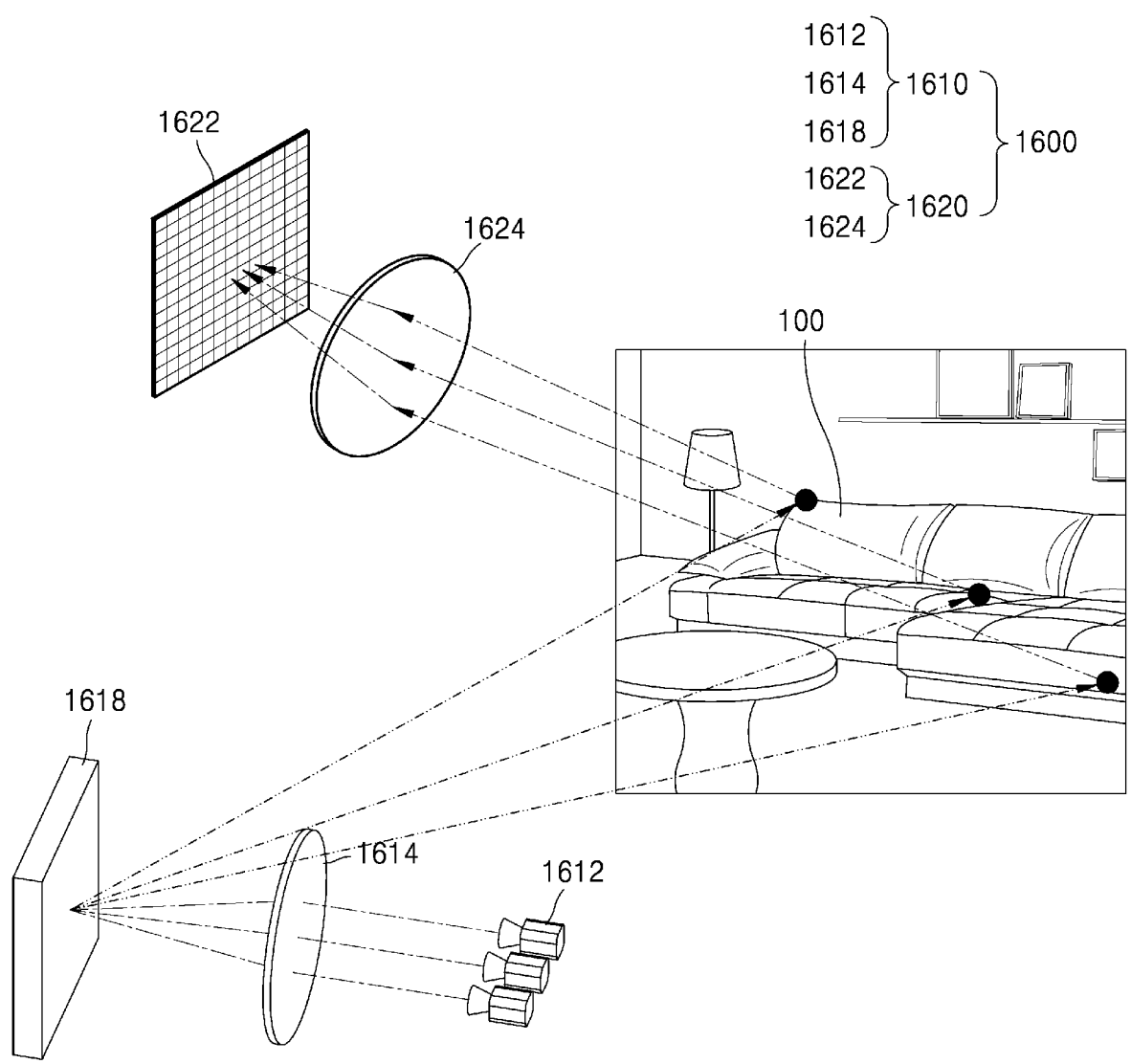
FIG. 10 is a diagram for describing a structure and an operation method of a depth sensor, according to an embodiment of the disclosure.

FIG. 10 is a diagram for describing a structure and an operation method of the depth sensor 1600, according to an embodiment of the disclosure.

The depth sensor 1600 is configured to obtain depth information about at least one object 100 included in the real world. The 'depth information' refers to information about a distance from the depth sensor 1600 to a specific object 100. According to an embodiment, the depth sensor 1600 may be implemented as a TOF sensor that radiates pattern light to the object 100 by using a light source and obtains depth information based on a time taken for the radiated pattern light to be reflected by the object 100 and detected again, that is, a flight time.

In the embodiment of FIG. 10, the depth sensor 1600 may include the light emitter 1610 and the light receiving sensor 1620.

The light emitter 1610 is configured to generate light and radiate the light in a direction toward the object 100. According to an embodiment, the light emitter 1610 may include a light source 1612, a collimating lens 1614, and an LC-based reflection mirror 1618.

The light source 1612 is configured to generate laser light or IR light and emit light toward the collimating lens 1614. According to an embodiment, the light source 1612 may be composed of vertical-cavity surface-emission lasers (VCSELs) that generate and emit point pattern light. However, embodiments of the disclosure are not limited thereto. The light source 1612 may be implemented as a laser light source or a light-emitting diode (LED).

The collimating lens 1614 is an optical lens that allows the light emitted by the light source 1612 to travel straight in parallel without being dispersed according to the directivity of the light. The collimating lens 1614 may form collimated light or perform a focusing function.

The light emitter 1610 may further include an optical element. The optical element may change a path of light that has linearity by passing through the collimating lens 1614, and may replicate the point pattern light. The optical element may change the light path through diffraction by a diffractive element such as a diffractive optical element (DOE), a holographic optical element (HOE), or a micro lens array (MLA).

The LC-based reflection mirror 1618 includes LC molecules, and is configured to adjust the refractive index of incident light by changing an arrangement angle of the LC molecules according to an electrical driving signal. The LC-based reflection mirror 1618 may be composed of an electrically tunable LC lens capable of changing a focus according to the electrical driving signal. According to an embodiment, the LC-based reflection mirror 1618 may locally adjust the refractive index of a specific region in an active region of the LC layer 1618LC, by changing the arrangement angle of LC molecules arranged in the specific region according to a control voltage applied through an excitation electrode. The AR device 1000 may radiate light to a region or the object 100 corresponding to an ROI by adjusting the refractive index of incident light by using the LC-based reflection mirror 1618.

The light emitter 1610 may further include a micro electro mechanical systems (MEMS) reflection mirror that mechanically changes a reflection direction of light. The MEMS reflection mirror is a device in which mechanical components, sensors, actuators, and electronic circuits are integrated on a silicon substrate, an organic substrate, or an organic material by microfabrication technology. The MEMS reflection mirror may reflect point pattern light emitted by the light source 1612 and having passed through the collimating lens 1614 and the optical element so that the point pattern light is radiated in a specific direction. The MEMS reflection mirror may rotate a module at a specific angle by using a motor included in the MEMS reflection mirror and reflects incident light in all directions, thereby radiating light to the entire space of the real world. According to an embodiment, the AR device may radiate light to the region corresponding to the ROI or to the object 100 by changing the reflection angle of the incident light by adjusting the rotation angle of the MEMS reflection mirror. The light receiving sensor 1620 is configured to collect and detect particles of light reflected by the object 100, that is, photons, and measure a time interval between a time point when light is incident from the light emitter 1610 and a time when the light is received. According to an embodiment, the light receiving sensor 1620 may include a SPAD array 1622 and an imaging lens 1624.

The SPAD array 1622 is a light receiving sensor that detects photons of light transmitted by the imaging lens 1624 and incident on the SPAD array 1622. The SPAD array may include a plurality of SPADs, and the plurality of SPADs may be arranged to form an n×m array. Each of the plurality of SPADs may correspond to a pixel of a generated depth map. Each of the plurality of SPADs receives photons by using avalanche multiplication that amplifies electrons like an avalanche from an incident single photon. The SPAD array 1622 may provide the processor 1400 (see FIG. 2) with information about the number of photons received by the plurality of SPADs and a light reception time. According to an embodiment, the light receiving sensor 1620 may further include time-to-digital converters (TDCs) 1626a (see FIG. 14) that convert time information about a time until photons are reflected by the object 100 and received, namely, information about an arrival time.

The imaging lens 1624 is an optical element that collects light reflected by the object 100 in the real world. The SPAD array 1622 may output a depth value corresponding to each pixel by collecting the photons of light collected through the imaging lens 1624.

Figure 11:
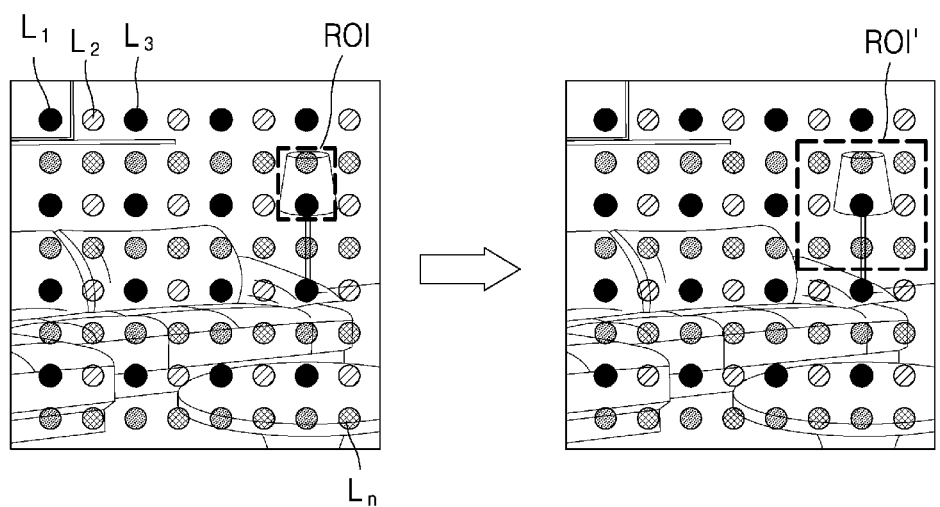
FIG. 11 is a diagram illustrating an embodiment in which an AR device according to the disclosure resizes an ROI based on the amount and number of pattern light beams emitted by a light emitter of a depth sensor.

FIG. 11 is a diagram illustrating an embodiment in which the AR device 1000 according to the disclosure resizes an ROI based on the amount and number of pattern light beams emitted by a light emitter of a depth sensor.

Referring to FIG. 11, the AR device 1000 may emit light to the entire space of the real world by using the light emitter 1610 (see FIG. 10) of the depth sensor. In the embodiment shown in FIG. 11, the light emitter 1610 may radiate a plurality of point pattern light beams $L_1$ through $L_n$ toward an object within the entire space by using the light source 1612 of FIG. 10. The arrangement of the plurality of point pattern light beams $L_1$ through $L_n$ and the number of point pattern light beams $L_1$ through $L_n$ shown in FIG. 11 are exemplary, and embodiments of the disclosure are not limited thereto.

Referring to the drawing on the left of FIG. 11, an ROI may be set in the entire region F corresponding to the entire space of the real world. The ROI is set based on the ROI confidence level, and a specific method of setting the ROI is the same as that described with reference to FIGS. 1 through 3. Thus, a redundant description thereof will be omitted. In the embodiment shown in FIG. 11, only two point pattern light beams are radiated to the ROI. When there are only two point pattern light beams radiated into the ROI, the resolution of a depth value related to the ROI is lowered, and thus the accuracy of the depth value of the ROI is lowered. In order to ensure the accuracy level of the depth value related to the ROI, light having a threshold number of pattern light beams and a light amount greater than or equal to a threshold light amount needs to be radiated. The threshold number of pattern light beams and the threshold light amount may be predetermined.

According to an embodiment, the AR device 1000 may resize the ROI so that a preset threshold amount of light and a preset threshold number of pattern light beams are radiated. Referring to the drawing on the right of FIG. 11, the AR device 1000 resize an ROI so that the ROI' may be radiated with a preset threshold amount of light and a preset threshold number of pattern light. The resized ROI' may be radiated with a number and amount of point pattern light beams, for example, 9 point pattern light beams, capable of guaranteeing a resolution of a certain level or greater and the accuracy of a depth value.

Figure 12:
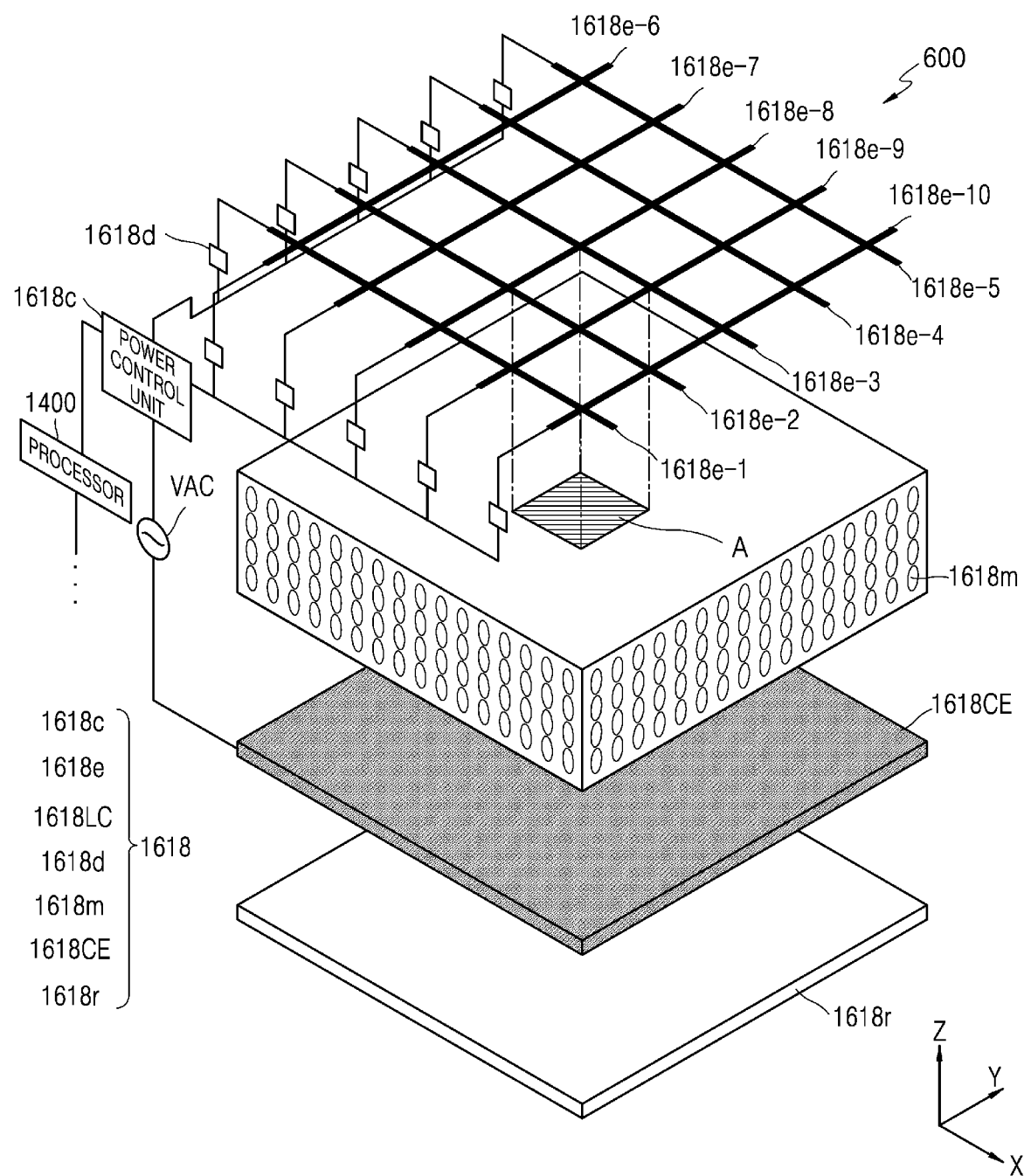
FIG. 12 is a diagram illustrating an embodiment in which an AR device according to the disclosure adjusts the refractive power of a liquid crystal (LC)-based reflection mirror included in a depth sensor.

FIG. 12 is a diagram illustrating an embodiment in which the AR device 1000 according to the disclosure adjusts the refractive power of the LC-based reflection mirror 1618 included in a depth sensor.

Referring to FIG. 12, the LC-based reflection mirror 1618 may include an LC layer 1618LC, a common electrode 1618CE, excitation electrodes 1618e-1 through 1618e-10, a driver terminal 1618d, and a reflective surface 1618r.

The LC-based reflection mirror 1618 may be an electrically tunable LC lens capable of adjusting the refractive power of light by changing the arrangement angle of LC molecules 1618m, based on a control voltage applied from a power supplier VAC through the excitation electrodes 1618e-1 through 1618e-10. According to an embodiment, the LC-based reflection mirror 1618 may include an electro-optic material having a pixel grid. The pixels may be arranged in a matrix of N rows and M columns.

The LC layer 1618LC may be an electro-optic layer including a plurality of LC molecules 1618m. The LC layer 1618LC may be an electro-optical layer in which physical properties of LC are changed by an applied control voltage. According to an embodiment, the LC layer 1618LC may be implemented as a polarization-independent LC layer (e.g., cholesteric LC) layer. The arrangement angle of LC molecules 1618m arranged in a specific region within an active region of the LC layer 1618LC may be changed according to control voltages applied through the excitation electrodes 1618e-1 through 1618e-10, so that the refractive index of the specific region may be locally adjusted.

The common electrode 1618CE and the excitation electrodes 1618e-1 through 1618e-10 may receive a control voltage from the power supplier VAC and apply the received control voltage to the LC layer 1618LC.

The reflection surface 1618r is formed in contact with a lower surface of the common electrode 1618CE. The reflection surface 1618r is made of a transparent reflective material. The reflection surface 1618r may be made of a metal material, an insulating material, or a combination thereof. The reflection surface 1618r may be formed of, for example, a metallic material such as copper, gold, silver, or aluminum, or an insulating material such as silicon oxide ($SiO_2$) or silicon nitride (SiN, $Si_3N_4$). According to an embodiment, the reflection surface 1618r may be formed of a combination of a copper layer and a silicon oxide ($SiO_2$) layer.

The reflection surface 1618r may reflect light emitted by the light source 1612 of the light emitter 1610 (see FIG. 10). The direction of light reflected by the reflection surface 1618r may be adjusted or changed based on the alignment angle of the LC molecules in the LC layer 1618LC.

The excitation electrodes 1618e-1 through 1618e-10 may be arranged in contact with an upper surface of the LC layer 1618LC. The excitation electrodes 1618e-1 through 1618e-10 may include first array excitation electrodes 1618e-1 through 1618e-5 and second array excitation electrodes 1618e-6 through 1618e-10 oriented in X-axis and Y-axis directions orthogonal to each other on an upper surface of a transparent thin layer 630. The first array excitation electrodes 1618e-1 through 1618e-5 and the second array excitation electrodes 1618e-6 through 1618e-10 may each include parallel strips of a conductive material extending over the active region. For example, the first array excitation electrodes 1618e-1 through 1618e-5 and the second array excitation electrodes 1618e-6 through 1618e-10 may each include a transparent conductive material such as indium tin oxide (ITO).

The power controller 1618c may be connected to the plurality of driver terminals 1618d and the power supplier VAC. The power controller 1618c may control the control voltages applied to the plurality of array excitation electrodes 1618e-1 through 1618e-10 by controlling the plurality of driver terminals 1618d, thereby controlling the arrangement angle of the LC molecules disposed in the specific region.

The processor 1400 (see FIG. 2) may apply a control voltage waveform having a phase modulation profile to each of the first array excitation electrodes 1618e-1 through 1618e-5 and the second array excitation electrodes 1618e-6 through 1618e-10 via the power supplier VAC, and may modulate the control voltage applied to each of the first array excitation electrodes 1618e-1 through 1618e-5 and the second array excitation electrodes 1618e-6 through 1618e-10. As a control voltage having a waveform modulated by the processor 1400 is applied, the LC-based reflection mirror 1618 may locally adjust the refractive power in the specific region within the active region by a phase modulation profile of the applied control voltage. The LC-based reflection mirror 1618 may function as a lens that adjusts a vergence according to the adjusted refractive power. The vergence is an index indicating the degree of convergence or divergence of light, and may be adjusted according to the refractive power of the LC-based reflection mirror 1618. The LC-based reflection mirror 1618 may change the path of light emitted by the light source 1612 (see FIG. 10) by adjusting the refractive power of the lens.

The processor 1400 may adjust the refractive power of the LC-based reflection mirror 1618 to change the light path of incident light so that the light is radiated to the ROI. Referring to the embodiment shown in FIG. 12, when the path of light incident upon region A in the active region of the LC layer 1618LC is changed, light may be radiated to an object or region in a space corresponding to the ROI among the entire space of the real world. According to an embodiment, the processor 1400 may change the alignment angle of the LC molecules disposed in region A among the plurality of LC molecules 1618m included in the LC layer 1618LC, by controlling the power controller 1618c to apply voltages to a third excitation electrode 1618e-3, a fourth excitation electrode 1618e-4, a seventh excitation electrode 1618e-7, and an eighth excitation electrode 1618e-8. According to another embodiment, the processor 1400 may change the alignment angle of the LC molecules disposed in region A by controlling the power controller 1618c to apply voltages to the third excitation electrode 1618e-3, the fourth excitation electrode 1618e-4, the seventh excitation electrode 1618e-7, and the eighth excitation electrode 1618e-8. In the above-described method, the processor 1400 may change a path of light incident upon region A so that the light is radiated to the ROI.

Figure 13:
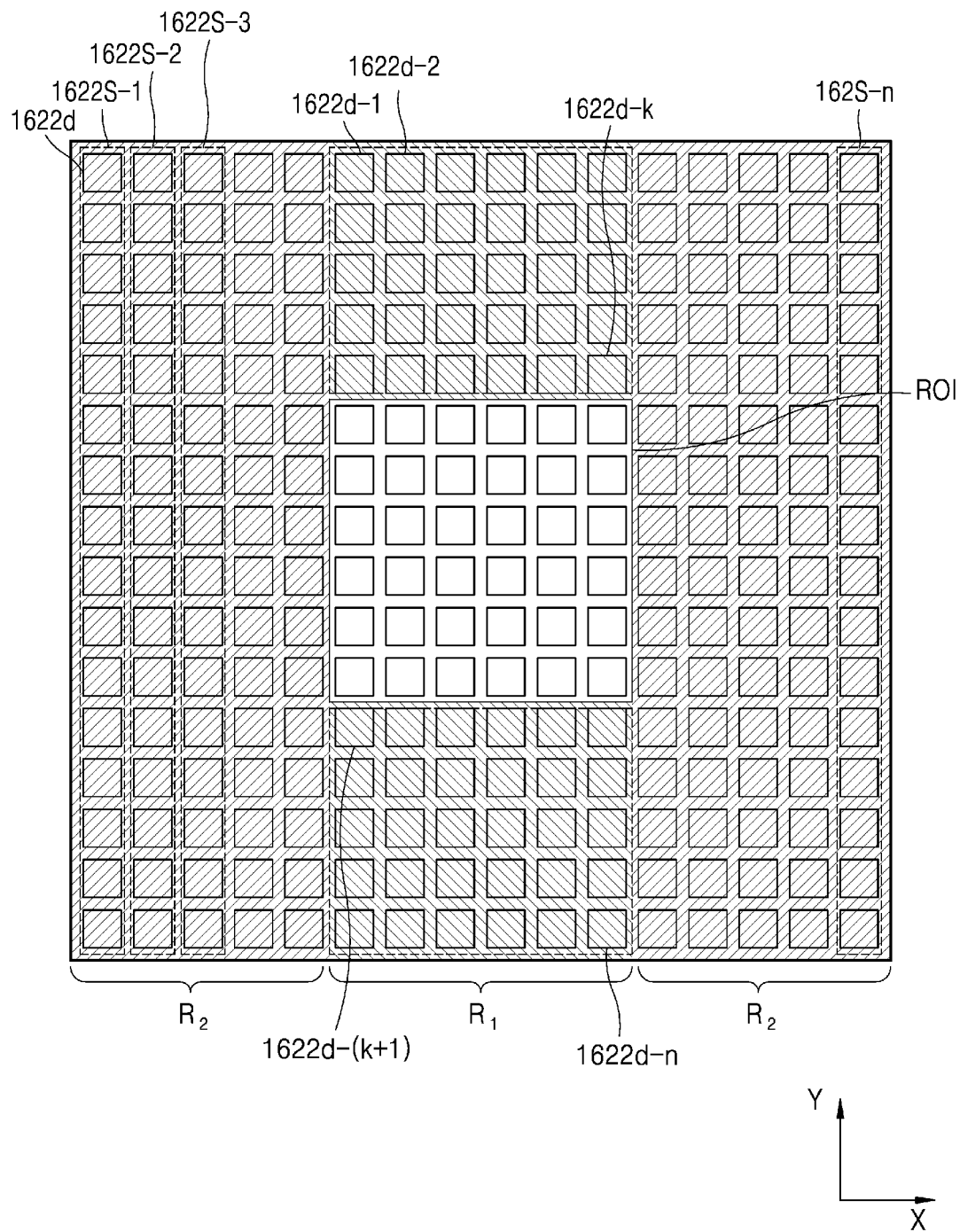
FIG. 13 is a diagram illustrating an embodiment in which an AR device according to the disclosure controls an operation of a light receiving sensor included in a depth sensor, based on an ROI.

FIG. 13 is a diagram illustrating a light receiving sensor included in a depth sensor according to an embodiment of the disclosure.

Referring to FIG. 13, the light receiving sensor may include an SPAD array 1622. The SPAD array 1622 may include a plurality of SPADs 1622d, and the plurality of SPADs 1622d may be arranged to form an n×m array. In the embodiment shown in FIG. 13, the SPAD array is composed of a total of 256 SPADs forming a 16×16 array. However, this is an example, and embodiments of the disclosure are not limited thereto. Each of the plurality of SPADs 1622d may correspond to a pixel of a depth map. In the embodiment shown in FIG. 13, a depth map having a total of 256 pixels of 16×16 may be obtained.

According to an embodiment, the SPAD array 1622 may be divided into a plurality of sections 1622S-1 through 1622S-n each extending in a second direction (Y-axis direction) and arranged in a first direction (X-axis direction). Each of the plurality of sections 1622S-1 through 1622S-n may include a plurality of SPADs 1622d disposed in the second direction (Y-axis direction). Respective on/off operations of the plurality of sections 1622S-1 through 1622S-n may be sequentially controlled according to a clock signal. For example, after a first section 1622S-1 is turned on and receives photons, a second section 1622S-2 is turned on and receives photons according to a clock signal interval, and this process may be performed up to an n-th section 1622S-n. When the second section 1622S-2 is turned on, the first section 1622S-1 is turned off. When the first section 1622S-1 through the n-th section 1622S-n are operated in an on state one by one to receive photons, a depth map of one frame including depth value information of all pixels may be obtained.

The processor 1400 of the AR device 1000 may control at least one section not disposed in a location corresponding to the ROI among the plurality of sections 1622S-1 through 1622S-n of the SPAD array 1622 to keep an off state, without applying power to the at least one section. For example, the processor 1400 may not apply power to keep sections disposed in a second region $R_2$ not corresponding to the ROI in an off state.

According to an embodiment, the processor 1400 may disable at least one SPAD not directly corresponding to the ROI within the first region $R_1$ and not receiving light reflected by an object located in the ROI. In the embodiment shown in FIG. 13, the processor 1400 may disable a plurality of SPADs 1622d-1 through 1622d-k and a plurality of SPADs 1622d-(k+1) through 1622d-n not disposed at the location corresponding to the ROI among the plurality of SPADs 1622d disposed in the first region $R_1$, without applying bias voltages to the plurality of SPADs 1622d-1 through 1622d-k and the plurality of SPADs 1622d-(k+1) through 1622d-n.

According to the embodiment shown in FIG. 13, the AR device 1000 maintains operations of SPADs not receiving light corresponding to the ROI, among the plurality of SPADs 1622d, in an off state, or disables the SPADs without applying bias voltages to the SPADs, thereby minimizing power consumption. Therefore, when the AR device 1000 is implemented as a portable device, technical effects capable of reducing battery consumption and extending use time are provided.

Figure 14:
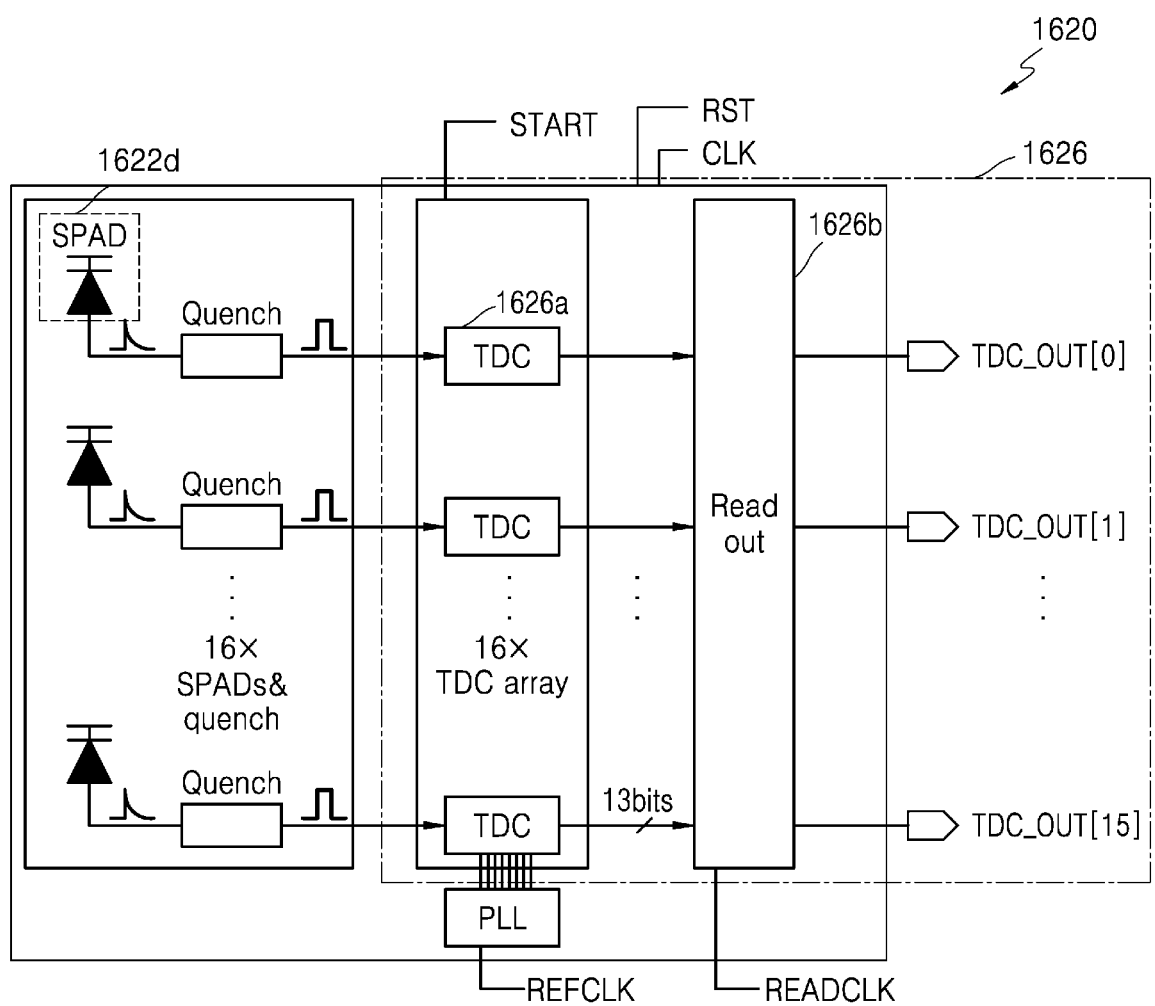
FIG. 14 is a circuit diagram that controls an operation of a light receiving sensor included in a depth sensor according to an embodiment of the disclosure.

FIG. 14 is a circuit diagram that controls an operation of a light receiving sensor included in a depth sensor according to an embodiment of the disclosure.

Referring to FIG. 14, the light receiving sensor 1620 may include a plurality of SPADs 1622d and a digital signal processor 1626. Because the plurality of SPADs 1622d are the same as those described above with reference to FIG. 13, redundant descriptions thereof are omitted.

The digital signal processor 1626 may include the TDCs 1626a and a read-out unit 1626b.

The TDCs 1626a are converters configured to convert information about the arrival time of photons received by the plurality of SPADs 1622d into digital signals. The TDCs 1626a are connected to the plurality of SPADs 1622d, respectively, and the number of TDCs 1626a is equal to the number of SPADs 1622d. Although the TDCs 1626a are configured as an array of 16 TDCs in FIG. 14, embodiments of the disclosure are not limited thereto. According to an embodiment, the TDCs 1626a may obtain information about the number of photons from the plurality of SPADs 1622d. The TDCs 1626a provide the converted digital signals to the read-out unit 1626b.

The read-out unit 1626b is configured to obtain the digital signals received from the plurality of TDCs 1626a, merge them in units of pixels, and provide a merged digital signal to the processor 1400 (see FIG. 2). According to an embodiment, the read-out unit 1626b may provide the processor 1400 with information about the number of photons received for each pixel.

FIG. 15 is a diagram illustrating an embodiment in which the AR device 1000 according to the disclosure adjusts the Tx intensity of the light emitter 1610, based on a photon histogram for each pixel obtained from the light receiving sensor 1620.

Referring to FIG. 15, the light receiving sensor 1620 obtains photon histograms 1510 through 1530 for pixels. The photon histograms 1510 through 1530 for pixels are histograms showing the photons received from the plurality of SPADs 1622d (see FIGS. 13 and 14), and each 'pixel' may correspond to each of the plurality of SPADs. The photon histograms 1510 through 1530 for pixels may include a first photon histogram 1510 when the Tx intensity is low due to the light emitter 1610, a second photon histogram 1520 when the Tx intensity is medium due to the light emitter 1610, and a third photon histogram 1530 when the Tx intensity is high due to the light emitter 1610.

The processor 1400 may obtain the photon histograms 1510 through 1530 for pixels from the light receiving sensor 1620, and determine the Tx intensity based on the obtained photon histograms 1510 through 1530 for pixels. According to an embodiment, the processor 1400 may identify peak values 1512, 1522, and 1532 of one or more of the gradient of received photons, a total sum of the photons, and a Z-score from the photon histograms 1510 through 1530 for pixels, and may determine a minimum Tx intensity capable of identifying the peak values 1512, 1522, and 1532. For example, when the processor 1400 identifies a peak value based on at least one of a photon gradient, a sum of photons, and a Z-score, the peak value 1512 is not identified from the first photon histogram 1510 having a lowest Tx intensity, and the peak value 1522 is identified from the second photon histogram 1520, the processor 1400 may determine the Tx intensity to be a medium intensity, which is an intensity at which the peak value 1522 is identified. As another example, when the processor 1400 may also identify the peak value 1512 from the first photon histogram 1510, the processor 1400 may determine the Tx intensity as a low intensity that is a minimum intensity at which the peak value 1512 is identified.

The processor 1400 may adjust the Tx intensity of the light emitter 1610 to a Tx intensity determined according to the photon histograms 1510 through 1530 for pixels.

According to the embodiment shown in FIG. 15, the AR device 1000 determines a minimum Tx intensity at which a peak value may be identified according to the photon histograms 1510 through 1530 for pixels, thereby optimizing the amount of power consumed by the light emitter 1610. Therefore, when the AR device 1000 is implemented as a portable device, technical effects capable of reducing battery consumption and extending use time are provided.

The AR device 1000 described above herein may be implemented as a hardware component, a software component, and/or a combination of hardware components and software components. For example, the AR device 1000 according to the disclosed embodiments may be implemented using one or more general-purpose or special-purpose computers, such as a processor, an arithmetic logic unit (ALU), application specific integrated circuits (ASICs), digital signal processors (DSPs), digital signal processing devices (DSPDs), programmable logic devices (PLDs), microcomputers, microprocessors, or any other device capable of executing and responding to instructions.

The software may include a computer program, a code, instructions, or a combination of one or more of the foregoing, and may configure a processing device so that the processing device can operate as intended, or independently or collectively give instructions to the processing device.

The software may be implemented as a computer program including instructions stored in computer-readable storage media. Examples of the computer-readable storage media include magnetic storage media (e.g., ROM, floppy disks, hard disks, etc.), and optical recording media (e.g., CD-ROMs, or digital versatile discs (DVDs)). The computer-readable storage media can be distributed over network coupled computer systems so that the computer-readable code is stored and executed in a distributive manner. These media can be read by the computer, stored in a memory, and executed by a processor.

A computer is a device capable of calling stored instructions from a storage medium and executing an operation according to a disclosed embodiment according to the called instructions, and may include the AR device 1000 according to the disclosed embodiments.

The computer-readable storage medium may be provided as a non-transitory storage medium. Here, 'non-transitory' means that the storage medium does not include a signal and is tangible, but does not distinguish whether data is stored semi-permanently or temporarily in the storage medium. For example, the non-transitory recording medium may include a buffer in which data is temporarily stored.

In addition, the AR device 1000 or operation methods thereof according to the disclosed embodiments may be provided in a computer program product. The computer program product, which is a commodity, may be traded between sellers and buyers.

Computer program products may include a software program and a computer-readable storage medium having the software program stored thereon. For example, computer program products may include a product in the form of a software program (e.g., a downloadable application) that is electronically distributed through manufacturers of the AR device 1000 or electronic markets (e.g., Google Play Store, AppStore, and so on). For electronic distribution, at least a portion of the software program may be stored on a storage medium or may be created temporarily. In this case, the storage medium may be a server of a manufacturer, a server of an electronic market, or a storage medium of a relay server for temporarily storing a software program.

The computer program product may include a storage medium of a server or a storage medium of a terminal in a system composed of a server and a terminal (e.g., an AR device). Alternatively, if there is a third device (e.g., a smartphone) in communication with the server or terminal, the computer program product may include a storage medium of the third device. Alternatively, the computer program product may include the S/W program itself transmitted from the server to the terminal or the third device, or transmitted from the third device to the terminal.

In this case, one of the server, the terminal, and the third device may execute the computer program product to perform the methods according to the disclosed embodiments. Alternatively, at least two of the server, the terminal, and the third device may execute the computer program product to distribute and perform the methods according to the disclosed embodiments.

For example, a server (e.g., a cloud server or an AI server) may execute a computer program product stored on a server to control a terminal communicating with the server to perform the methods according to the disclosed embodiments.

As another example, a third device may execute a computer program product to control a terminal in communication with the third device to perform the methods according to the disclosed embodiments.

When the third device executes the computer program product, the third device may download the computer program product from the server and execute the downloaded computer program product. Alternatively, the third device may execute a computer program product provided in a preloaded state to perform methods according to the disclosed embodiments.

While the disclosure has been particularly shown and described with reference to examples thereof, it will be understood by those of ordinary skill in the art that various changes in form and details may be made therein without departing from the spirit and scope of the disclosure as defined by the following claims. For example, an appropriate result may be attained even when the above-described techniques are performed in a different order from the above-described method, and/or components, such as the above-described electronic device, structure, and circuit, are coupled or combined in a different form from the above-described methods or substituted for or replaced by other components or equivalents thereof.

What is claimed is:

1. An augmented reality (AR) device for obtaining depth information of an object, the AR device comprising:
   a gaze tracking sensor configured to obtain a gaze point by tracking a gaze direction of a user's eye;
   a depth sensor configured to obtain depth information of the object;
   a memory storing one or more instructions; and
   at least one processor configured to execute the one or more instructions to:
      determine a region of interest (ROI) confidence level indicating a degree to which at least one partial region within a field of view (FOV) of the AR device is predicted as an ROI, based on at least one of a moving speed, an acceleration, a fixation time, a fixation number, or a location of the gaze point;
      determine a region surrounding the gaze point corresponding to an object within the at least one partial region at which the ROI confidence level is greater than or equal to a preset threshold value;
      set the region as an ROI; and
      set a parameter for controlling an operation of the depth sensor to obtain depth information of the object within the ROI.

2. The AR device of claim 1, wherein the at least one processor is further configured to determine the ROI confidence level based on at least one of a fixation time and a fixation number of a gaze point at which gaze directions of both eyes of the user converge, a moving speed of the gaze point, an acceleration of the gaze point, or a location of the gaze point.

3. The AR device of claim 1, wherein the at least one processor is further configured to determine the ROI confidence level based on a proportional relationship with at least one of the fixation time or the fixation number of the gaze point.

4. The AR device of claim 1, wherein the at least one processor is further configured to determine the ROI confidence level according to an inversely proportional relationship with at least one of the moving speed or the acceleration of the gaze point.

5. The AR device of claim 1, further comprising a camera configured to photograph the FOV of the AR device to obtain an image of the FOV,
   wherein the at least one processor is further configured to adjust a resolution and a frame rate of a portion of a depth map image obtained by the camera that corresponds to the determined ROI to values higher than a depth map resolution and a frame rate of another portion.

6. The AR device of claim 1, wherein the depth sensor comprises a light emitter configured to radiate light onto the object, and wherein the at least one processor is further configured to resize the ROI so that a predetermined amount of light and a predetermined number of pattern light beams are radiated onto the determined ROI by the light emitter.

7. The AR device of claim 6, wherein the light emitter comprises a light source and a liquid crystal (LC)-based reflection mirror, and wherein the at least one processor is further configured to adjust a power applied to the LC-based reflection mirror by changing an arrangement of LC molecules within an LC layer of the LC-based reflection mirror, so that the pattern light beams are radiated to the ROI.

8. The AR device of claim 7, wherein the depth sensor further comprises a light receiving sensor comprising a plurality of sections, the light receiving sensor being configured to receive the light radiated by the light source and reflected by the object, wherein on/off operations of the plurality of sections are sequentially controlled according to a preset clock signal, and wherein the at least one processor is further configured to control the light receiving sensor to sequentially turn on at least one section corresponding to the ROI among the plurality of sections and maintain at least one section not corresponding to the ROI in an off state.

9. An operation method of an augmented reality (AR) device for obtaining depth information of an object in a real world, the operation method comprising:

obtaining a gaze point by tracking a gaze direction of a user's eye;

determining a region of interest (ROI) confidence level indicating a degree to which at least one partial region within a field of view (FOV) of the AR device is predicted as an ROI, based on at least one of a moving speed, an acceleration, a fixation time, a fixation number, or a location of the gaze point;

determining a region surrounding the gaze point corresponding to an object within the at least one partial region at which the ROI confidence level is greater than or equal to a preset threshold value;

setting the region as an ROI; and setting a parameter for controlling an operation of a depth sensor of the AR device that is used to obtain depth information of the object within the ROI.

10. The operation method of claim 9, wherein the determining the ROI confidence level comprises determining the ROI confidence level, based on at least one of a fixation time and a fixation number of a gaze point, at which gaze directions of both eyes of the user converge, a moving speed of the gaze point, an acceleration of the gaze point, or a location of the gaze point.

11. The operation method of claim 9, wherein the depth sensor comprises a light emitter configured to generate radiate the light onto the object, and wherein the setting of the parameter of the depth sensor comprises resizing the ROI so that a predetermined amount of light and a predetermined number of pattern light beams are radiated onto the determined ROI by the light emitter.

12. The operation method of claim 11, wherein the depth sensor comprises a light receiving sensor comprising a plurality of sections, the light receiving sensor being configured to receive the light radiated by the light emitter and reflected by the object, wherein on/off operations of the plurality of sections are sequentially controlled according to a preset clock signal, and wherein the setting the parameter of the depth sensor comprises sequentially turning on at least one section corresponding to the ROI among the plurality of sections and maintaining at least one section not corresponding to the ROI in an off state.

13. A non-transitory computer-readable storage medium storing instructions which are executable at least one processor of an augmented reality (AR) device to perform a method to obtain depth information of an object in a real world, the method comprising:

obtaining a gaze point by tracking a gaze direction of a user's eye;

determining a region of interest (ROI) confidence level indicating a degree to which at least one partial region within a field of view (FOV) of the AR device is predicted as an ROI, based on at least one of a moving speed, an acceleration, a fixation time, a fixation number, or a location of the gaze point;

determining a region surrounding the gaze point corresponding to an object within the at least one partial region at which the ROI confidence level is greater than or equal to a preset threshold value;

setting the region as an ROI; and setting a parameter for controlling an operation of a depth sensor of the AR device that is used to obtain depth information of the object within the ROI.

* * * * *